United States Patent
Irvine et al.

(10) Patent No.: US 12,453,777 B2
(45) Date of Patent: *Oct. 28, 2025

(54) USES OF AMPHIPHILES IN IMMUNE CELL THERAPY AND COMPOSITIONS THEREFOR

(71) Applicant: Massachusetts Institute of Technology, Cambridge, MA (US)

(72) Inventors: Darrell J. Irvine, Arlington, MA (US); Peter C. Demuth, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 490 days.

This patent is subject to a terminal disclaimer.

(21) Appl. No.: 16/825,482

(22) Filed: Mar. 20, 2020

(65) Prior Publication Data

US 2020/0345853 A1    Nov. 5, 2020

Related U.S. Application Data

(60) Provisional application No. 62/821,248, filed on Mar. 20, 2019.

(51) Int. Cl.
| | |
|---|---|
| *A61K 47/54* | (2017.01) |
| *A61K 39/39* | (2006.01) |
| *A61K 40/11* | (2025.01) |
| *A61K 40/31* | (2025.01) |
| *A61K 40/32* | (2025.01) |
| *A61K 40/42* | (2025.01) |
| *C07K 14/705* | (2006.01) |
| *C07K 14/725* | (2006.01) |
| *C07K 16/28* | (2006.01) |

(52) U.S. Cl.
CPC ............ *A61K 47/543* (2017.08); *A61K 39/39* (2013.01); *A61K 40/11* (2025.01); *A61K 40/31* (2025.01); *A61K 40/32* (2025.01); *A61K 40/4202* (2025.01); *C07K 14/705* (2013.01); *C07K 14/7051* (2013.01); *C07K 14/70521* (2013.01); *C07K 16/2803* (2013.01); *C07K 16/2866* (2013.01); *C07K 2317/622* (2013.01); *C07K 2317/76* (2013.01); *C07K 2319/02* (2013.01); *C07K 2319/03* (2013.01); *C07K 2319/30* (2013.01); *C07K 2319/33* (2013.01)

(58) Field of Classification Search
None
See application file for complete search history.

(56) References Cited

U.S. PATENT DOCUMENTS

| | | |
|---|---|---|
| 7,615,539 B2 | 11/2009 | Uhlmann et al. |
| 7,741,297 B2 | 6/2010 | Jiang et al. |
| 9,426,778 B2 | 8/2016 | Onozawa et al. |
| 10,029,016 B2 | 7/2018 | Irvine et al. |
| 10,953,105 B2 | 3/2021 | Irvine et al. |
| 2006/0246126 A1 | 11/2006 | Allen et al. |
| 2007/0104654 A1 | 5/2007 | Hsieh et al. |
| 2007/0154398 A1 | 7/2007 | Wang et al. |
| 2008/0139262 A1 | 6/2008 | Lin |
| 2010/0183639 A1 | 7/2010 | Uhlmann et al. |
| 2011/0300163 A1 | 12/2011 | Champion et al. |
| 2012/0087949 A1 | 4/2012 | Tan et al. |
| 2012/0121606 A1 | 5/2012 | Ruben et al. |
| 2012/0129199 A1 | 5/2012 | Daftarian et al. |
| 2012/0294931 A1 | 11/2012 | Kim et al. |
| 2013/0295129 A1 | 11/2013 | Irvine et al. |
| 2014/0099337 A1 | 4/2014 | Davis et al. |
| 2014/0162944 A1 | 6/2014 | Tiberg et al. |
| 2014/0255378 A1 | 9/2014 | Watkins et al. |
| 2014/0294932 A1 | 10/2014 | Kim et al. |
| 2015/0044208 A1 | 2/2015 | Castanheira Aires da Silva et al. |
| 2015/0232514 A1 | 8/2015 | Dockal et al. |
| 2015/0283205 A1 | 10/2015 | Phipps et al. |
| 2016/0228573 A1 | 8/2016 | Niyikiza et al. |
| 2016/0361360 A1 | 12/2016 | Chang et al. |
| 2017/0224797 A1 | 8/2017 | Popescu et al. |
| 2018/0028634 A1 | 2/2018 | Chen |
| 2019/0062457 A1* | 2/2019 | Elias ............... C07K 16/40 |
| 2020/0230221 A1 | 7/2020 | Irvine et al. |
| 2021/0187112 A1 | 6/2021 | Irvine et al. |

(Continued)

FOREIGN PATENT DOCUMENTS

| | | |
|---|---|---|
| EP | 0491628 A2 | 6/1992 |
| JP | 8-510255 A | 10/1996 |
| JP | 2010-507386 A | 3/2010 |

(Continued)

OTHER PUBLICATIONS

Glienke et al, Frontiers in Pharmacology, Feb. 12, 2015, vol. 6, Article 21, p. 1-7. (Year: 2015).*
Malia et al, Proteins, 2016, 84:427-434. (Year: 2016).*
Barthelemy et al, Journal of Biological Chemistry, 2008, 283:3639-3654. (Year: 2008).*
Beiboer et al, Journal of Molecular Biology, 2000, 296:833-849. (Year: 2000).*
Choi et al, 2011, Molecular Biosystems, 2011, 7:3327-3334. (Year: 2011).*

(Continued)

*Primary Examiner* — Gary B Nickol
*Assistant Examiner* — Cheom-Gil Cheong
(74) *Attorney, Agent, or Firm* — McCarter & English, LLP; Jill Mello

(57) ABSTRACT

Provided herein are methods for stimulating an immune response to a target cell population or a target tissue in a subject by administering to the subject a composition comprising an amphiphilic ligand conjugate. Such an amphiphilic ligand conjugate can comprise a lipid, one or more cargos (e.g., a CAR ligand, a chimeric cytokine receptor target, a chimeric co-stimulation receptor target, a synNotch receptor target), and optionally a linker.

5 Claims, No Drawings

Specification includes a Sequence Listing.

(56) References Cited

U.S. PATENT DOCUMENTS

| | | | |
|---|---|---|---|
| 2023/0372395 A1* | 11/2023 | Irvine | A61K 39/4631 |
| 2024/0082373 A1 | 3/2024 | Irvine et al. | |

FOREIGN PATENT DOCUMENTS

| | | | |
|---|---|---|---|
| JP | 2014-504294 A | 2/2014 | |
| JP | 2015-514108 A | 5/2015 | |
| KR | 10-2015-0030724 A | 3/2015 | |
| WO | 1994/001138 A1 | 1/1994 | |
| WO | 1994/026778 A1 | 11/1994 | |
| WO | 2003/066649 A1 | 8/2003 | |
| WO | 2004/029277 A2 | 4/2004 | |
| WO | 2005/117984 A2 | 12/2005 | |
| WO | 2008/115319 A2 | 9/2008 | |
| WO | 2008/121949 A1 | 10/2008 | |
| WO | 2008/139262 A2 | 11/2008 | |
| WO | 2010/071852 A2 | 6/2010 | |
| WO | 2012/082841 A2 | 6/2012 | |
| WO | 2013/151771 A1 | 10/2013 | |
| WO | 2014/011987 A1 | 1/2014 | |
| WO | 2014/204762 A1 | 12/2014 | |
| WO | 2015/057834 A1 | 4/2015 | |
| WO | 2016/069647 A1 | 5/2016 | |
| WO | 2017/035009 A1 | 3/2017 | |
| WO | 2017/137477 A1 | 8/2017 | |
| WO | 2017/141243 A1 | 8/2017 | |
| WO | 2019060425 A1 | 3/2019 | |

OTHER PUBLICATIONS

De Genst et al, Developmental and Comparative Immunology, 2006, 30:187-98. (Year: 2006).*
Griffiths et al, The EMBO Journal, 1993, 12:725-734. (Year: 1993).*
Klimka et al, British Journal of Cancer, 2000, 83:252-260. (Year: 2000).*
Ward et al, Nature, 1989, 341:544-546. (Year: 1989).*
U.S. Appl. No. 16/644,893, filed Mar. 5, 2020, Darrell J. Irvine.
International Preliminary Report on Patentability, PCT/US2020/023896, dated Sep. 16, 2021, 12 pages.
International Search Report and Written Opinion, PCT/US2020/023896, dated Sep. 16, 2020, 21 pages.
Takagi, M. et al., "Chimeric Cytokine Receptor Can Transduce Expansion Signals in Interleukin 6 Receptor alpha (IL-6Ra)-IL-11Ra-, and gp130-low to -negative Primitive Hematopoietic Progenitors," Molecular Biology of the Cell, vol. 10:3633-3642 (1999).
Watanabe, N. et al., "Molecular Therapy," vol. 22, Supplement 1, (2014)Copyright The American Society of Gene & Cell Therapy Cancer-Targeted Gene & Cell Therapy II 772. Conferring CAR T Cells With Resistance to TGF[beta]1 Using a Signal Converter, May 1, 2014 (May 1, 2014-), XP55725574, Retrieved from the Internet:URL:https://www.cell.com/action/showPdf?pi i=S1525-0016(16)35785-9 [retrieved on Aug. 27, 2020].
Wilkie, S. et al., "Selective Expansion of Chimeric Antigen Receptor-targeted T-cells with Potent Effector Function using Interleukin-4" Journal of Biological Chemistry, vol. 285 (33):25538-25544 (2010).
Bejestani, E. et al., "Characterization of a switchable chimeric antigen receptor platform in a pre-clinical solid tumor model," OncoImmunology, 16 pages (2017).
Cao, Y. et al., "Design of Switchable Chimeric Antigen Receptor T Cells Targeting Breast Cancer," Angew. Chem. Int. Ed., vol. 55: 7520-7524 (2016).
International Preliminary Report on Patentability, PCT/US2018/051764, dated Mar. 24, 2020, 9 pages.
International Search Report and Written Opinion, PCT/US2018/051764, dated Mar. 8, 2019, 13 pages.
Invitation to Pay Additional Fees, and, Where Applicable, Protest Fee, PCT/US2020/023896, dated Jun. 19, 2020, 14 pages.
Irvine, D. et al. "Enhancing combination immunotherapy and adoptive cell therapy of cancer via lymph node-targeted vaccines," Synthetic Immunotherapy, Abstract IA06:pp. IA06-IA06 (2018).
Irvine, D. et al. "Enhancing the function of CAR T cells via a universal vaccine strategy,"Abstract IA37: Cancer Immunology Research, 4th CRI-CIMT-EATI-AACR International Cancer Immunotherapy Conference: Translating Science Into Survival, American Association for Cancer Research, US; New York, NY, USA, vol. 7, No. Suppl. 2, (2019).
Kim, M-S., et al., "Redirection of Genetically Engineered CAR-T Cells Using Bifunctional Small Molecules," J. Am. Chem. Soc, 4 page (2015).
Kudo, K. et al., "T Lymphocytes Expressing a CD16 Signaling Receptor Exert Antibody-Dependent Cancer Cell Killing," Cancer Res., vol. 74(1):93-103 (2013).
Liu, H. et al., "Structure-based programming of lymphnode targeting in molecular vaccines," Nature, vol. 507 (7493):519-522 (2014).
Lohmueller, J. et al., "mSA2 affinity-enhanced biotin-binding CAR-T cells for universal tumor targeting," OncoImmunology, 21 pages (2017).
Ma, J. et al., "Versatile strategy for controlling the specificity and activity of engineered T cells," PNAS, vol. 113(4): E450-E458 (2016).
Ma, L. et al., "Enhanced CAR-T cell activity against solid tumors by vaccine boosting through the chimeric receptor," Science.vol. 365: 162-168 (2019).
Rodgers, D. et al., "Switch-mediated activation and retargeting of CAR-T cells for B-cell malignancies," PNAS, 113(4): E459-E468 (2016).
Urbanska, K. et al., "A Universal Strategy for Adoptive Immunotherapy of Cancer through Use of a Novel T-cell Antigen Receptor," Cancer Research, vol. 72:1844-1852 (2012).
Aldwell et al., Oral delivery of lipid-encapsulated Mycobacterium bovis BCG extends survival of the bacillus in vivo and induces a long-term protective immune response against tuberculosis. Vaccine. Mar. 15, 2006;24(12):2071-8.
Andrews et al., Conjugation of lipid and CpG-containing oligonucleotide yields an efficient method for liposome Incorporation. Bioconjug Chem. Jul. 20, 2011;22(7):1279-86.
Bachmann et al., Vaccine delivery: a matter of size, geometry, kinetics and molecular patterns. Nat Rev Immunol. Nov. 2010;10(11):787-96.
Bagby et al., Impact of molecular weight on lymphatic drainage of a biopolymer-based imaging agent. Pharmaceutics. May 23, 2012;4(2):276-95.
Ballas et al., Divergent therapeutic and immunologic effects of oligodeoxynucleotides with distinct CpG motifs. J Immunol. Nov. 1, 2001;167(9):4878-86.
Bedoui et al., Cross-presentation of viral and self antigens by skin-derived CD103+ dendritic cells. Nat Immunol. May 2009;10(5):488-95.
Bourquin et al., Targeting CpG oligonucleotides to the lymph node by nanoparticles elicits efficient antitumoral Immunity. J Immunol. Sep. 1, 2008;181(5):2990-8.
Cai et al., Lymphatic drug delivery using engineered liposomes and solid lipid nanoparticles. Adv Drug Deliv Rev. Sep. 10, 2011;63(10-11):901-8.
Cuomo et al., Oligonucleotides and polynucleotides condensation onto liposome surface: effects of the base and of the nucleotide length. Colloids Surf B Biointerfaces. Apr. 1, 2013;104:239-44.
Dass. Lipoplex-mediated delivery of nucleic acids: factors affecting in vivo transfection. J Mol Med (Berl). Sep. 2004;82 (9):579-91.
Davis. G-quartets 40 years later: from 5'-GMP to molecular biology and supramolecular chemistry. Angew Chem Int Ed Engl. Jan. 30, 2004;43(6):668-98.
Fujita et al., Overview and outlook of Toll-like receptor ligand-antigen conjugate vaccines. Ther Deliv. Jun. 2012;3 (6):749-60.
Goldblatt. Conjugate vaccines. Clin Exp Immunol. Jan. 2000;119(1):1-3.
Heegaard et al., Dendrimers for vaccine and immunostimulatory uses. A review. Bioconjug Chem. Mar. 17, 2010;21 (3):405-18.
Hubbell et al., Materials engineering for immunomodulation. Nature. Nov. 26, 2009;462(7272):449-60.
Johansen et al., Lympho-geographical concepts in vaccine delivery. J Control Release. Nov. 20, 2010;148(1):56-62.

(56) References Cited

OTHER PUBLICATIONS

Kaminskas et al., PEGylation of polylysine dendrimers improves absorption and lymphatic targeting following SC administration in rats. J Control Release. Dec. 3, 2009;140(2):108-16.
Kaminskas et al., Targeting the lymphatics using dendritic polymers (dendrimers). Adv Drug Deliv Rev. Sep. 10, 2011;63(10-11):890-900.
Keler et al., Antibody-targeted vaccines. Oncogene. May 28, 2007;26(25):3758-67.
Klinman. Immunotherapeutic uses of CpG oligodeoxynucleotides. Nat Rev Immunol. Apr. 2004;4(4):249-58.
Kobayashi et al., Delivery of gadolinium-labeled nanoparticles to the sentinel lymph node: comparison of the sentinel hode visualization and estimations of intra-nodal gadolinium concentration by the magnetic resonance imaging. J Control Release. Apr. 10, 2006;111(3):343-51.
Kobayashi et al., Multimodal nanoprobes for radionuclide and five-color near-infrared optical lymphatic imaging. ACS Nano. Nov. 2007;1(4):258-64.
Kwong et al., Induction of potent anti-tumor responses while eliminating systemic side effects via liposome-anchored combinatorial immunotherapy. Biomaterials. Aug. 2011;32(22):5134-47.
Liu et al., DNA-based micelles: synthesis, micellar properties and size-dependent cell permeability. Chemistry. Mar. 22, 2010;16(12):3791-7.
Liu et al., Guiding principles in the design of molecular bioconjugates for vaccine applications. Bioconjug Chem. May 20, 2015;26(5):791-801.
Liu et al., Membrane anchored immunostimulatory oligonucleotides for in vivo cell modification and localized immunotherapy. Angew Chem Int Ed Engl. Jul. 25, 2011;50(31):7052-5.
Manolova et al., Nanoparticles target distinct dendritic cell populations according to their size. Eur J Immunol. May 2008;38(5):1404-13.
McLennan et al., Subcutaneous drug delivery and the role of the lymphatics. Drug Discov Today Technol. 2005 Spring;2(1):89-96.
Mishra et al., Improved leishmanicidal effect of phosphorotioate antisense oligonucleotides by LDL-mediated delivery. Biochim Biophys Acta. Nov. 7, 1995;1264(2):229-37.
Moon et al., Engineering nano- and microparticles to tune immunity. Adv Mater. Jul. 24, 2012;24(28):3724-46.
Moyle et al., Modern subunit vaccines: development, components, and research opportunities. ChemMedChem. Mar. 2013;8(3):360-76.
Oyewumi et al., Nano-microparticles as immune adjuvants: correlating particle sizes and the resultant immune responses. Expert Rev Vaccines. Sep. 2010;9(9):1095-107.
Pal et al., The role of the lymphatic system in vaccine trafficking and immune response. Adv Drug Deliv Rev. Sep. 10, 2011;63(10-11):909-22.
Pape et al., The humoral immune response is initiated in lymph nodes by B cells that acquire soluble antigen directly in the follicles. Immunity. Apr. 2007;26(4):491-502.
Paramasivan et al., Circular dichroism of quadruplex DNAs: applications to structure, cation effects and ligand binding. Methods. Dec. 2007;43(4):324-31.
Perrie et al., Vaccine adjuvant systems: enhancing the efficacy of sub-unit protein antigens. Int J Pharm. Dec. 8, 2008;364(2):272-80.
Pilishvili et al., Sustained reductions in invasive pneumococcal disease in the era of conjugate vaccine. J Infect Dis. Jan. 1, 2010;201(1):32-41.

Rao et al., Biodegradable PLGA based nanoparticles for sustained regional lymphatic drug delivery. J Pharm Sci. Apr. 2010;99(4):2018-31.
Reddy et al., Exploiting lymphatic transport and complement activation in nanoparticle vaccines. Nat Biotechnol. Oct. 2007;25(10):1159-64.
Robbins et al., Polysaccharide-protein conjugates: a new generation of vaccines. J Infect Dis. May 1990;161 (5):821-32.
Schnorrer et al., The dominant role of CD8+ dendritic cells in cross-presentation is not dictated by antigen capture. Proc Natl Acad Sci U S A. Jul. 11, 2006;103(28):10729-34.
Senti et al., Intralymphatic immunotherapy. Curr Opin Allergy Clin Immunol. Dec. 2009;9(6):537-43.
Shariat et al., P5 HER2/neu-derived peptide conjugated to liposomes containing MPL adjuvant as an effective prophylactic vaccine formulation for breast cancer. Cancer Lett. Dec. 1, 2014;355(1):54-60.
Singh et al., Nanoparticles and microparticles as vaccine-delivery systems. Expert Rev Vaccines. Oct. 2007;6 (5):797-808.
Slovin et al., Carbohydrate vaccines as immunotherapy for cancer. Immunol Cell Biol. Aug. 2005;83(4):418-28.
Smith et al., Cutting edge: conventional CD8 alpha+ dendritic cells are preferentially involved in CTL priming after footpad infection with herpes simplex virus-1. J Immunol. May 1, 2003;170(9):4437-40.
St. John et al., Synthetic mast-cell granules as adjuvants to promote and polarize immunity in lymph nodes. Nat Mater. Jan. 22, 2012;11(3):250-7.
Storhoff et al., One-Pot Colorimetric Differentiation of Polynucleotides with Single Base Imperfections Using Gold Nanoparticle Probes. J Am. Chem. Soc. 1998;120(9):1959-64.
Tacken et al., Dendritic-cell immunotherapy: from ex vivo loading to in vivo targeting. Nat Rev Immunol. Oct. 2007;7 (10):790-802.
Takakura et al., Development of a novel polymeric prodrug of mitomycin C, mitomycin C-dextran conjugate with anionic charge. II. Disposition and pharmacokinetics following intravenous and intramuscular administration. Int. J. Pharma. Jun. 1987;37(1):145-54.
Tenbusch et al., Immunogenicity of DNA vaccines encoding simian immunodeficiency virus antigen targeted to dendritic cells in rhesus macaques. PLoS One. 2012;7(6):e39038.
Tsopelas et al., Why certain dyes are useful for localizing the sentinel lymph node. J Nucl Med. Oct. 2002;43 (10):1377-82.
Vollmer et al., Immunotherapeutic applications of CpG oligodeoxynucleotide TLR9 agonists. Adv Drug Deliv Rev. Mar. 28, 2009;61(3):195-204.
Von Beust et al., Improving the therapeutic index of CpG oligodeoxynucleotides by intralymphatic administration. Eur J Immunol. Jun. 2005;35(6):1869-76.
Wilson et al., Lipid-based delivery of CpG oligonucleotides enhances immunotherapeutic efficacy. Adv Drug Deliv Rev. Mar. 28, 2009;61(3):233-42.
Wong et al., Lymphatic drainage of skin to a sentinel lymph node in a feline model. Ann Surg. Nov. 1991;214 (5):637-41.
Wu et al., Fluorescence imaging of the lymph node uptake of proteins in mice after subcutaneous injection: molecular weight dependence. Pharm Res. Jul. 2012;29(7):1843-53.
Zepp. Principles of vaccine design—Lessons from nature. Vaccine. Aug. 31, 2010;28 Suppl 3:C14-24.

* cited by examiner

USES OF AMPHIPHILES IN IMMUNE CELL THERAPY AND COMPOSITIONS THEREFOR

RELATED APPLICATIONS

This application claims the benefit of U.S. Provisional Patent Application Ser. No. 62/821,248, filed Mar. 20, 2019. The entire contents of which is incorporated herein by reference.

STATEMENT OF GOVERNMENT INTEREST

This invention was made with government support under CA247632 awarded by The National Institutes of Health. The government has certain rights in the invention.

REFERENCE TO SEQUENCE LISTING

The instant application contains a Sequence Listing which has been submitted electronically in ASCII format and is hereby incorporated by reference in its entirety. Said ASCII copy, created Jul. 24, 2020, is named "MITN-052_Sequence-Listing.txt" and is 702 bytes in size.

BACKGROUND OF THE INVENTION

Cancer is one of the leading causes of death in the world, with over 14 million new cancer cases diagnosed and over eight million cancer deaths occurring each year. The American Cancer Society estimates 1,762,450 new cases of cancer and 606,880 cancer deaths in the United States in 2019. While several treatments for cancer have been developed, the disease still remains a significant problem.

There thus exists a need for improved treatments for cancer.

SUMMARY OF THE INVENTION

The invention provides, inter alia, amphiphilic ligand conjugates comprising a lipid, a cargo, and optionally a linker, and related uses for stimulating an immune response in a subject.

In a first aspect, the invention provides a method of stimulating an immune response to a target cell population or a target tissue in a subject, the method including administering a composition to the subject, wherein the composition includes an amphiphilic ligand conjugate including a lipid, a chimeric antigen receptor (CAR) ligand, and optionally a linker, and wherein the subject includes an immune cell including a CAR, wherein the immune cell is not a T cell.

In some embodiments, the target cell or target tissue expresses an antigen. In further embodiments, the amphiphilic ligand conjugate binds albumin under physiological conditions. In some embodiments, the immune cell is a B cell, a natural killer (NK) cell, a macrophage, a neutrophil, a dendritic cell, a mast cell, an eosinophil, or a basophil; or the immune cell is a tumor infiltrating lymphocyte (TIL).

In further embodiments, the method includes activating the immune cell, expanding the immune cell, and/or increasing proliferation of the immune cell. In some embodiments, proliferation of CAR(−) immune cells is not increased in the subject. In particular embodiments, the immune response is an anti-tumor immune response.

In some embodiments, the target cell population or the target tissue is a tumor cell population or a tumor tissue. In some embodiments, the method includes reducing or decreasing the size of the tumor tissue or inhibiting growth of the tumor cell population or the tumor tissue in the subject, e.g., wherein the subject has a disease, a disorder, or a condition associated with expression or elevated expression of the antigen.

The subject can be administered the composition prior to receiving the immune cell including the CAR, after receiving the immune cell including the CAR, or the composition and the immune cell including the CAR are administered simultaneously.

In some embodiments, the CAR includes an extracellular domain including a target-binding domain that binds to the CAR ligand, a transmembrane domain, and an intracellular signaling domain. In further embodiments, the CAR further includes one or more co-stimulatory domains.

In particular embodiments, the target-binding domain includes an antigen-binding fragment of an antibody. For example, the antigen-binding fragment of the antibody includes a single chain variable fragment (scFv), e.g., an anti-FITC scFv.

In some embodiments, the transmembrane domain includes a hinge/transmembrane domain, e.g., a hinge/transmembrane domain of an immunoglobulin-like protein, CD28, CD8, or 4-1 BB.

In some embodiments, the intracellular signaling domain is a TCRζ, FcRγ, FcRβ, CD3γ, CD3θ, CD3ε, CD3η, CD3ζ, CD22, CD79a, CD79b, CD66d, BCR, CD21, CD19, CD81, NKp46, NKp44, NKp30, NKG2D, CD16, SR-A, CD36, CR3, dectin-1, TLR2, TLR4, TLR7, FcγRI, FcγRIIA, FcγRIIIA, FcγRIIIB, FcεRI, DAP12, or FcαRI intracellular signaling domain, e.g., a CD79a or CD79b intracellular signaling domain.

In further embodiments, the co-stimulatory domain is a 4-1 BB, CD27, CD28, OX40, ICOS, GITR, or CD40 co-stimulatory domain.

In some embodiments, the amphiphilic ligand conjugate is trafficked to the lymph nodes. In other embodiments, the amphiphilic ligand conjugate is trafficked to the inguinal lymph node and axillary lymph node. In further embodiments, the amphiphilic ligand conjugate is inserted into the membrane of an antigen presenting cell (e.g., a medullary macrophage, a CD8+ dendritic cell, or a CD11b+ dendritic cell) upon trafficking to the lymph nodes. In some embodiments, the CAR ligand is retained in the lymph nodes for at least 4 days, at least 5 days, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, at least 20 days, at least 21 days, at least 22 days, at least 23 days, at least 24 days, or at least 25 days.

In some embodiments, the composition further includes an adjuvant, e.g., an amphiphilic oligonucleotide conjugate including an immunostimulatory oligonucleotide conjugated to a lipid, with or without a linker, and optionally a polar compound. In some embodiments, the immunostimulatory oligonucleotide binds a pattern recognition receptor. In further embodiments, the immunostimulatory oligonucleotide includes CpG. In other embodiments, the immunostimulatory oligonucleotide is a ligand for a toll-like receptor.

In some embodiments, the linker is selected from the group consisting of hydrophilic polymers, a string of hydrophilic amino acids, polysaccharides, or a combination thereof. In some embodiments, the linker includes N consecutive polyethylene glycol units, wherein N is from 25-50. In other embodiments, the linker is an oligonucleotide linker, e.g., wherein the oligonucleotide linker includes N consecutive guanines, wherein N is from 1-15.

In further embodiments, the lipid is diacyl lipid.

In some embodiments, the CAR ligand is the antigen expressed by the target cell population or the target tissue, a tumor associated antigen, a hapten, a fluorophore, a peptide mimotope, or a tag (e.g., fluorescein isothiocyanate (FITC), streptavidin, biotin, dinitrophenol, peridinin chlorophyll protein complex, green fluorescent protein, phycoerythrin (PE), horse radish peroxidase, a palmitoyl group, a nitrosyl group, alkaline phosphatase, glucose oxidase, and maltose binding protein). In particular embodiments, the tag is FITC.

In some embodiments, the method further includes administering a formulation including a tagged protein including a protein (e.g., an antibody or an antigen-binding fragment thereof) and a tag described herein, and wherein the target-binding domain of the CAR binds the tagged protein. The formulation can be administered to the subject prior to administration of the immune cell including the CAR and/or the composition including the amphiphilic ligand conjugate, administered to the subject concurrently with administration of the immune cell including the CAR and/or the composition including the amphiphilic ligand conjugate, or administered to the subject after administration of the immune cell including the CAR and/or the composition including the amphiphilic ligand conjugate. The immune cell including the CAR can be administered prior to administration of the composition including the amphiphilic ligand conjugate, after administration of the composition including the amphiphilic ligand conjugate, or concurrently with administration of the composition including the amphiphilic ligand conjugate.

In another aspect, the invention features a method of stimulating an immune response to a target cell population or a target tissue in a subject, the method including administering to the subject a composition, wherein the composition includes an amphiphilic ligand conjugate including a lipid, a first chimeric cytokine receptor target, optionally a second chimeric cytokine receptor target, and optionally a linker, and wherein the subject includes an immune cell including a chimeric cytokine receptor.

In some embodiments, the immune cell further includes a transgenic T cell receptor (tgTCR) and/or the CAR of the preceding aspect. In some embodiments, the target cell or the target tissue expresses an antigen.

In some embodiments, the amphiphilic ligand conjugate includes the first chimeric cytokine receptor target and the second chimeric cytokine receptor target. In some embodiments, the first chimeric cytokine receptor target and the second chimeric cytokine receptor target are different.

In further embodiments, the amphiphilic ligand conjugate binds albumin under physiological conditions.

In some embodiments, the immune cell is a T cell, a TIL (e.g., T cell, a B cell, or an NK cell), an NK cell, a natural killer T (NKT) cell, a gamma delta T (gdT) cell, a macrophage, a neutrophil, a dendritic cell, a mast cell, an eosinophil, or a basophil. In some embodiments, the method includes activating the immune cell, expanding the immune cell, and/or increasing proliferation of the immune cell. In some embodiments, proliferation of chimeric cytokine receptor(−) immune cells is not increased in the subject.

In some embodiments, the immune response is an anti-tumor immune response. In further embodiments, the target cell population or the target tissue is a tumor cell population or a tumor tissue. In other embodiments, the method includes reducing or decreasing the size of the tumor tissue or inhibiting growth of the tumor cell population or the tumor tissue in the subject. In some embodiments, the subject has a disease, a disorder, or a condition associated with expression or elevated expression of the antigen.

The subject can be administered the composition prior to receiving the immune cell including the chimeric cytokine receptor, after receiving the immune cell including the chimeric cytokine receptor, or the composition and the immune cell including the chimeric cytokine receptor are administered simultaneously.

In further embodiments, the chimeric cytokine receptor includes an extracellular domain including a target-binding domain that binds to the first chimeric cytokine receptor target or the second chimeric cytokine receptor target, a transmembrane domain, and an intracellular cytokine receptor domain.

In some embodiments, the target-binding domain includes an antigen-binding fragment of an antibody. In some embodiments, the antigen-binding fragment of the antibody includes an scFv, e.g., an anti-FITC scFv.

In some embodiments, the target-binding domain includes FK506 binding protein (FKBP), FKBP rapamycin binding domain (FRB), or avidin, or a portion thereof.

In further embodiments, the intracellular cytokine receptor domain includes a type I cytokine receptor intracellular domain, a type II cytokine receptor intracellular domain, an immunoglobulin cytokine receptor intracellular domain, a tumor necrosis family (TNF) superfamily receptor intracellular domain, a chemokine receptor intracellular domain, or a transforming growth factor-β (TGF-β) receptor intracellular domain. In some embodiments, the type I cytokine receptor is an interleukin (IL) receptor (e.g., IL-2 receptor, an IL-3 receptor, an IL-4 receptor, an IL-5 receptor, an IL-6 receptor, an IL-7 receptor, an IL-9 receptor, an IL-11 receptor, an IL-12 receptor, an IL-13 receptor, an IL-15 receptor, an IL-18 receptor, an IL-21 receptor, an IL-23 receptor, or an IL-27 receptor), a colony stimulating factor receptor (e.g., an erythropoietin receptor (EpoR), a granulocyte-macrophage colony-stimulating factor (GM-CSF) receptor, or a granulocyte colony-stimulating factor (G-CSF) receptor), a hormone receptor (e.g., prolactin receptor), or a neuropeptide receptor. In particular embodiments, the intracellular cytokine receptor domain includes an IL-2 receptor β-chain intracellular domain, an IL-7 receptor α-chain intracellular domain, an IL-15 receptor α-chain intracellular domain, an IL-18 receptor α-chain intracellular domain, an IL-18 receptor β-chain intracellular domain, and/or a common γ-chain receptor intracellular domain.

In some embodiments, the immune cell includes two chimeric cytokine receptors, one of which that binds to the first cytokine receptor target and one of which that binds to the second cytokine receptor target. In some embodiments, one chimeric cytokine receptor includes a target-binding domain including FKBP and the other chimeric cytokine receptor includes a target-binding domain including FRB. In other embodiments, one chimeric cytokine receptor includes a target-binding domain including an anti-FITC scFv and the other chimeric cytokine receptor includes a target-binding domain including avidin.

In some embodiments, the amphiphilic ligand conjugate is trafficked to the lymph nodes. In some embodiments, the amphiphilic ligand conjugate is trafficked to the inguinal lymph node and axillary lymph node. In further embodiments, the amphiphilic ligand conjugate is inserted into the membrane of an antigen presenting cell (e.g., a medullary macrophage, a CD8+ dendritic cell, or a CD11b+ dendritic cell) upon trafficking to the lymph nodes. In some embodiments, the chimeric cytokine receptor target is retained in the lymph nodes for at least 4 days, at least 5 days, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, at least 20 days, at least 21 days, at least 22 days, at least 23 days, at least 24 days, or at least 25 days.

In some embodiments, the composition further includes an adjuvant. In some embodiments, the adjuvant is an amphiphilic oligonucleotide conjugate including an immunostimulatory oligonucleotide conjugated to a lipid, with or without a linker, and optionally a polar compound. In some embodiments, the immunostimulatory oligonucleotide binds a pattern recognition receptor. In some embodiments, the immunostimulatory oligonucleotide includes CpG. In other embodiments, the immunostimulatory oligonucleotide is a ligand for a toll-like receptor.

In some embodiments, the linker is selected from the group consisting of hydrophilic polymers, a string of hydrophilic amino acids, polysaccharides, or a combination thereof. In certain embodiments, the linker includes N consecutive polyethylene glycol units, wherein N is from 25-50. In other embodiments, the linker is an oligonucleotide linker. In some embodiments, the oligonucleotide linker includes N consecutive guanines, wherein N is from 1-15.

In some embodiments, the lipid is diacyl lipid.

In some embodiments, the first chimeric cytokine receptor target and/or the second cytokine receptor target is the antigen expressed by the target cell population or the target tissue, a dimerizing agent (e.g., FK506, rimiducid, rapamycin, AP20187, AP1903, or AP21967), a tumor associated antigen, a hapten, a fluorophore, a peptide mimotope, or a tag (e.g., FITC, streptavidin, biotin, dinitrophenol, peridinin chlorophyll protein complex, green fluorescent protein, PE, horse radish peroxidase, a palmitoyl group, a nitrosyl group, alkaline phosphatase, glucose oxidase, and maltose binding protein). In particular embodiments, the tag is FITC.

In some embodiments, the first cytokine receptor target is biotin and the second cytokine receptor target is FITC. In other embodiments, the first cytokine receptor target is FK506 and the second cytokine receptor target is rapamycin.

In other embodiments, the method includes administering a formulation including a tagged protein including a protein (e.g., an antibody or an antigen-binding fragment thereof) and a tag described herein, and wherein the target-binding domain binds the tagged protein. The formulation can be administered to the subject prior to administration of the immune cell including the chimeric cytokine receptor and the composition including the amphiphilic ligand conjugate, administered to the subject concurrently with administration of the immune cell including the chimeric cytokine receptor and the composition including the amphiphilic ligand conjugate, or administered to the subject after administration of the immune cell including the chimeric cytokine receptor and the composition including the amphiphilic ligand conjugate. The immune cell including the chimeric cytokine receptor can be administered prior to administration of the composition including the amphiphilic ligand conjugate, after administration of the composition including the amphiphilic ligand conjugate, or concurrently with administration of the composition including the amphiphilic ligand conjugate.

In another aspect, the invention features a method of stimulating an immune response to a target cell population or a target tissue in a subject, the method including administering to the subject a composition, wherein the composition includes an amphiphilic ligand conjugate including a lipid, a first chimeric co-stimulation receptor target, optionally a second chimeric co-stimulation receptor target, and optionally a linker, and wherein the subject includes an immune cell including a chimeric co-stimulation receptor.

In some embodiments, the immune cell further includes a tgTCR and/or the CAR of the preceding aspects. In some embodiments, the target cell or the target tissue expresses an antigen.

In some embodiments, the amphiphilic ligand conjugate includes the first chimeric co-stimulation receptor target and the second chimeric co-stimulation receptor target. The first chimeric cytokine receptor target and the second chimeric cytokine receptor target can be the same, or the first chimeric cytokine receptor target and the second chimeric cytokine receptor target can be different.

In some embodiments, the amphiphilic ligand conjugate binds albumin under physiological conditions.

In some embodiments, the immune cell is a T cell, a TIL (e.g., T cell, B cell, or an NK cell), an NK cell, an NKT cell, a gdT cell, a macrophage, a neutrophil, a dendritic cell, a mast cell, an eosinophil, or a basophil. In some embodiments, the method includes activating the immune cell, expanding the immune cell, and/or increasing proliferation of the immune cell. In further embodiments, proliferation of chimeric co-stimulation receptor(−) immune cells is not increased in the subject.

In further embodiments, the immune response is an anti-tumor immune response. In some embodiments, the target cell population or the target tissue is a tumor cell population or a tumor tissue. In other embodiments, the method includes reducing or decreasing the size of the tumor tissue or inhibiting the growth of the tumor cell population or the tumor tissue in the subject.

In certain embodiments, the subject has a disease, a disorder, or a condition associated with expression or elevated expression of the antigen. The subject can be administered the composition prior to receiving the immune cell including the chimeric co-stimulation receptor, after receiving the immune cell including the chimeric co-stimulation receptor, or the composition and the immune cell including the chimeric co-stimulation receptor are administered simultaneously.

In some embodiments, the chimeric co-stimulation receptor includes an extracellular domain including a target-binding domain that binds to the first chimeric co-stimulation receptor target and/or the second chimeric co-stimulation receptor target, a transmembrane domain, and a co-stimulatory domain.

In some embodiments, the target-binding domain includes an antigen-binding fragment of an antibody. In some embodiments, the antigen-binding fragment of the antibody includes an scFv, e.g., an anti-FITC scFv.

In further embodiments, the co-stimulatory domain includes a 4-1 BB, CD27, CD28, OX40, ICOS, GITR, or CD40 co-stimulatory domain.

In other embodiments, the chimeric co-stimulation receptor further includes an intracellular signaling domain, e.g., a TCRζ, FcRγ, FcRβ, CD3γ, CD3θ, CD3ε, CD3η, CD3', CD22, CD79a, CD79b, CD66d, ILR chain, CD28, BCR, CD21, CD19, CD81, NKp46, NKp44, NKp30, NKG2D, CD16, SR-A, CD36, CR3, dectin-1, TLR2, TLR4, TLR7, FcγRI, FcγRIIA, FcγRIIIA, FcγRIIIB, FcεRI, DAP12, or FcαRI intracellular signaling domain.

In some embodiments, the immune cell includes two chimeric co-stimulation receptors, one of which that binds to the first chimeric co-stimulation receptor target and one of which that binds to the second chimeric co-stimulation receptor target. In certain embodiments, the chimeric co-stimulation receptor binds to both the first chimeric co-stimulation receptor target and the second co-stimulation receptor target. In further embodiments, the chimeric co-stimulation receptor includes an extracellular domain including two target-binding domains, one of which that binds to the first chimeric co-stimulation receptor target and one of which that binds to the second chimeric co-stimulation receptor target, a transmembrane domain, and a co-stimulatory domain.

In some embodiments, the first target-binding domain or the second target-binding domain each include FKBP, or a portion thereof; or, the first target-binding domain and the second target-binding domain each include FKBP, or a portion thereof.

In other embodiments, the first target-binding domain or the second target-binding domain each include FKBP12, or a portion thereof; or the first target-binding domain and the second target-binding domain each include FKBP12, or a portion thereof.

In yet other embodiments, the first target-binding domain or the second target-binding domain each include FRB, or a portion thereof; or the first target-binding domain and the second target-binding domain each include FRB, or a portion thereof.

In some embodiments, the chimeric co-stimulation receptor includes two or more co-stimulatory domains, e.g., a CD40 co-stimulatory domain and a MyD88 co-stimulatory domain.

In further embodiments, the amphiphilic ligand conjugate is trafficked to the lymph nodes. In some embodiments, the amphiphilic ligand conjugate is trafficked to the inguinal lymph node and axillary lymph node. In other embodiments, the amphiphilic ligand conjugate is inserted into the membrane of an antigen presenting cell (e.g., a medullary macrophage, a CD8+ dendritic cell, or a CD11b+ dendritic cell) upon trafficking to the lymph nodes. In some embodiments, the chimeric co-stimulation receptor target is retained in the lymph nodes for at least 4 days, at least 5 days, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, at least 20 days, at least 21 days, at least 22 days, at least 23 days, at least 24 days, or at least 25 days.

In some embodiments, the composition further includes an adjuvant. In some embodiments, the adjuvant is an amphiphilic oligonucleotide conjugate including an immunostimulatory oligonucleotide conjugated to a lipid, with or without a linker, and optionally a polar compound. In further embodiments, the immunostimulatory oligonucleotide binds a pattern recognition receptor. In particular embodiments, the immunostimulatory oligonucleotide includes CpG. In other embodiments, the immunostimulatory oligonucleotide is a ligand for a toll-like receptor.

In some embodiments, the linker is selected from the group consisting of hydrophilic polymers, a string of hydrophilic amino acids, polysaccharides, or a combination thereof. In particular embodiments, the linker includes N consecutive polyethylene glycol units, wherein N is from 25-50. In some embodiments, the linker is an oligonucleotide linker. In other embodiments, the oligonucleotide linker includes N consecutive guanines, wherein N is from 1-15.

In certain embodiments, the lipid is diacyl lipid.

In some embodiments, the chimeric co-stimulation receptor target is the antigen expressed by the target cell population or the target tissue, a dimerizing agent (e.g., FK506, rimiducid, rapamycin, AP20187, AP1903, or AP21967), a tumor associated antigen, a hapten, a fluorophore, a peptide mimotope, or a tag (e.g., FITC, streptavidin, biotin, dinitrophenol, peridinin chlorophyll protein complex, green fluorescent protein, PE, horse radish peroxidase, a palmitoyl group, a nitrosyl group, alkaline phosphatase, glucose oxidase, and maltose binding protein). In certain embodiments, the tag is FITC.

In some embodiments, the method further includes administering a formulation including a tagged protein including a protein (e.g., an antibody or an antigen-binding fragment thereof) and a tag described herein, and wherein the target-binding domain binds the tagged protein. The formulation can be administered to the subject prior to administration of the immune cell including the chimeric co-stimulation receptor and the composition including the amphiphilic ligand conjugate, administered to the subject concurrently with administration of the immune cell including the chimeric co-stimulation receptor and the composition including the amphiphilic ligand conjugate, or administered to the subject after administration of the immune cell including the chimeric co-stimulation receptor and the composition including the amphiphilic ligand conjugate. The immune cell including the chimeric co-stimulation receptor can be administered prior to administration of the composition including the amphiphilic ligand conjugate, after administration of the composition including the amphiphilic ligand conjugate, or concurrently with administration of the composition including the amphiphilic ligand conjugate.

In another aspect, the invention provides a method of stimulating an immune response to a target cell population or a target tissue in a subject, the method including administering to the subject a composition, wherein the composition includes an amphiphilic ligand conjugate including a lipid, a synthetic Notch (synNotch) receptor target, and optionally a linker, and wherein the subject includes an immune cell including a synNotch receptor.

In some embodiments, the immune cell further includes a tgTCR and/or the CAR of the preceding aspects. In some embodiments, the target cell or the target tissue expresses an antigen.

In some embodiments, the amphiphilic ligand conjugate binds albumin under physiological conditions.

In some embodiments, the immune cell is a T cell, a TIL (e.g., T cell, a B cell, or an NK cell), an NK cell, an NKT cell, a gdT cell, a macrophage, a neutrophil, a dendritic cell, a mast cell, an eosinophil, or a basophil. In some embodiments, the method includes activating the immune cell, expanding the immune cell, and/or increasing proliferation of the immune cell. In some embodiments, proliferation of synNotch receptor(−) immune cells is not increased in the subject.

In some embodiments, the immune response is an anti-tumor immune response. In further embodiments, the target cell population or the target tissue is a tumor cell population or a tumor tissue. In some embodiments, the method includes reducing or decreasing the size of the tumor tissue or inhibiting growth of the tumor cell population or the tumor tissue in the subject.

In some embodiments, the subject has a disease, a disorder, or a condition associated with expression or elevated expression of the antigen. The subject can be administered the composition prior to receiving the immune cell including the synNotch receptor, after receiving the immune cell including the synNotch receptor, or the composition and the immune cell including the synNotch receptor are administered simultaneously.

In some embodiments, the synNotch receptor includes an extracellular domain including a target-binding domain that binds to the synNotch receptor target, a Notch regulatory region, and an intracellular transcriptional domain.

In some embodiments, the target-binding domain includes an antigen-binding fragment of an antibody. In particular embodiments, the antigen-binding fragment of the antibody includes an scFv, e.g., an anti-FITC scFv.

In some embodiments, the intracellular transcriptional domain includes a transcriptional activator including a DNA binding domain, wherein the transcriptional activator replaces a naturally-occurring intracellular Notch domain, and wherein binding of the target-binding domain induces cleavage at the S2 and S3 proteolytic cleavage sites thereby replacing the intracellular domain. In some embodiments, release of the intracellular domain causes the transcriptional activator to induce expression of a gene product in the immune cell. In certain embodiments, release of the intracellular domain induces secretion of a cytokine, e.g., interleukin (IL)-2, IL-15, IL-7, IL-21, IL-12, IL-18, interferon-α (IFN-α), or interferon-β (IFN-β).

In some embodiments, the amphiphilic ligand conjugate is trafficked to the lymph nodes. In some embodiments, the amphiphilic ligand conjugate is trafficked to the inguinal lymph node and axillary lymph node. In some embodiments, the amphiphilic ligand conjugate is inserted into the membrane of an antigen presenting cell (e.g., a medullary macrophage, a CD8+ dendritic cell, or a CD11b+ dendritic cell) upon trafficking to the lymph nodes. In some embodiments, the synNotch receptor target is retained in the lymph nodes for at least 4 days, at least 5 days, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, at least 20 days, at least 21 days, at least 22 days, at least 23 days, at least 24 days, or at least 25 days.

In further embodiments, the composition further includes an adjuvant. In some embodiments, the adjuvant is an amphiphilic oligonucleotide conjugate including an immunostimulatory oligonucleotide conjugated to a lipid, with or without a linker, and optionally a polar compound. In some embodiments, the immunostimulatory oligonucleotide binds a pattern recognition receptor. In particular embodiments, the immunostimulatory oligonucleotide includes CpG. In other embodiments, the immunostimulatory oligonucleotide is a ligand for a toll-like receptor.

In some embodiments, the linker is selected from the group consisting of hydrophilic polymers, a string of hydrophilic amino acids, polysaccharides, or a combination thereof. In some embodiments, the linker includes N consecutive polyethylene glycol units, wherein N is from 25-50. In further embodiments, the linker is an oligonucleotide linker. In certain embodiments, the oligonucleotide linker includes N consecutive guanines, wherein N is from 1-15.

In some embodiments, the lipid is diacyl lipid.

In some embodiments, the synNotch receptor target is the antigen expressed by the target cell population or the target tissue, a tumor associated antigen, a hapten, a fluorophore, a peptide mimotope, or a tag (e.g., FITC, streptavidin, biotin, dinitrophenol, peridinin chlorophyll protein complex, green fluorescent protein, PE, horse radish peroxidase, a palmitoyl group, a nitrosyl group, alkaline phosphatase, glucose oxidase, and maltose binding protein). In particular embodiments, the tag is FITC.

In some embodiments, the method further includes administering a formulation including a tagged protein including a protein (e.g., an antibody or an antigen-binding fragment thereof) and a tag described herein, and wherein the target-binding domain binds the tagged protein. The formulation can be administered to the subject prior to administration of the immune cell including the synNotch receptor and the composition including the amphiphilic ligand conjugate, administered to the subject concurrently with administration of the immune cell including the synNotch receptor and the composition including the amphiphilic ligand conjugate, or administered to the subject after administration of the immune cell including the synNotch receptor and composition including the amphiphilic ligand conjugate. The immune cell including the synNotch receptor can be administered prior to administration of the composition including the amphiphilic ligand conjugate, after administration of the composition including the amphiphilic ligand conjugate, or concurrently with administration of the composition including the amphiphilic ligand conjugate.

In some embodiments of any of the preceding aspects, the subject has cancer. In some embodiments of any of the preceding aspects, the subject is human.

In another aspect, the invention provides an amphiphilic ligand conjugate including a lipid, a first ligand, a second ligand, and optionally a linker. The first ligand and the second ligand can be the same, or the first ligand and the second ligand can be different.

In some embodiments, the first ligand and/or the second ligand is a dimerizing agent (e.g., FK506, rimiducid, rapamycin, AP20187, AP1903, or AP21967), a tumor associated antigen, a hapten, a fluorophore, a peptide mimotope, or a tag (e.g., FITC, streptavidin, biotin, dinitrophenol, peridinin chlorophyll protein complex, green fluorescent protein, PE, horse radish peroxidase, palmitoylation, nitrosylation, alkalanine phosphatase, glucose oxidase, and maltose binding protein). In further embodiments, the first ligand and/or the second ligand is a tag. In certain embodiments, the tag is FITC.

In some embodiments, the amphiphilic ligand conjugate binds albumin under physiological conditions.

In some embodiments, the linker is selected from the group consisting of hydrophilic polymers, a string of hydrophilic amino acids, polysaccharides, or a combination thereof. In some embodiments, the linker includes N consecutive polyethylene glycol units, wherein N is from 25 and 50. In some embodiments, the linker is an oligonucleotide linker. In other embodiments, the oligonucleotide linker includes N consecutive guanines, wherein N is from 1-15.

In further embodiments, the lipid is a diacyl lipid.

In some embodiments, the first ligand and/or the second ligand binds to a receptor (e.g., an endogenous receptor, a CAR, a chimeric cytokine receptor, a chimeric co-stimulation receptor, and/or a synNotch receptor) on a cell (e.g., a human cell). In some embodiments, the cell is an immune cell, e.g., a T cell, a TIL (e.g., T cell, a B cell, or an NK cell), an NK cell, an NKT cell, a gdT cell, a macrophage, a neutrophil, a dendritic cell, a mast cell, an eosinophil, or a basophil.

In another aspect, the invention features a pharmaceutical composition including any one of the amphiphilic ligand conjugates described herein and a pharmaceutically acceptable excipient.

Definitions

Terms used in the claims and specification are defined as set forth below unless otherwise specified.

It must be noted that, as used in the specification and the appended claims, the singular forms "a," "an" and "the" include plural referents unless the context clearly dictates otherwise.

As used herein, "about" will be understood by persons of ordinary skill and will vary to some extent depending on the context in which it is used. If there are uses of the term which are not clear to persons of ordinary skill given the context in which it is used, "about" will mean up to plus or minus 10% of the particular value.

As used herein, the term "adjuvant" refers to a compound that, with a specific immunogen or antigen, will augment or otherwise alter or modify the resultant immune response. Modification of the immune response includes intensification or broadening the specificity of either or both antibody and cellular immune responses. Modification of the immune response can also mean decreasing or suppressing certain antigen-specific immune responses. In certain embodiments, the adjuvant is a cyclic dinucleotide. In another example, the adjuvant is an oligonucleotide, such as a CpG.

"Amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refers to chemical compounds that have a structure that is different from the general chemical structure of an amino acid, but that function in a manner similar to a naturally occurring amino acid.

Amino acids can be referred to herein by either their commonly known three letter symbols or by the one-letter symbols recommended by the IUPAC-IUB Biochemical Nomenclature Commission. Nucleotides, likewise, can be referred to by their commonly accepted single-letter codes.

An "amino acid substitution" refers to the replacement of at least one existing amino acid residue in a predetermined amino acid sequence (an amino acid sequence of a starting polypeptide) with a second, different "replacement" amino acid residue. An "amino acid insertion" refers to the incorporation of at least one additional amino acid into a predetermined amino acid sequence. While the insertion will usually consist of the insertion of one or two amino acid residues, the present larger "peptide insertions," can be made, e.g., insertion of about three to about five or even up to about ten, fifteen, or twenty amino acid residues. The inserted residue(s) may be naturally occurring or non-naturally occurring as disclosed above. An "amino acid deletion" refers to the removal of at least one amino acid residue from a predetermined amino acid sequence.

As used herein, "amphiphile" or "amphiphilic" refers to a conjugate having a hydrophilic head group and a hydrophobic tail, thereby forming an amphiphilic conjugate. In some embodiments, an amphiphile conjugate includes a chimeric antigen receptor (CAR) ligand, a chimeric cytokine receptor target, a chimeric co-stimulation receptor target, or a synNotch receptor target, and one or more hydrophobic lipid tails, referred to herein as an "amphiphilic ligand conjugate." In certain embodiments, the amphiphile further includes a polymer (e.g., polyethylene glycol), wherein the polymer links one or more lipids and the CAR ligand, the chimeric cytokine receptor target, the chimeric co-stimulation receptor target, or the synNotch receptor target.

The term "ameliorating" refers to any therapeutically beneficial result in the treatment of a disease state, e.g., cancer, including prophylaxis, lessening in the severity or progression, remission, or cure thereof.

The term "antigen presenting cell" or "APC" refers to a cell (e.g., an immune system cell such as an accessory cell (e.g., a B cell, a dendritic cell, or a macrophage)) that displays an antigen (e.g., a foreign antigen) complexed with major histocompatibility complexes (MHCs) on its surface. In some embodiments, the APC may be a professional APC (e.g., a cell that expresses MHC class II molecules, including a B cell, a dendritic cell, or a macrophage). In other embodiments, the APC may be a non-professional APC (e.g., a cell that expresses MHC class I molecules, such as a fibroblast, a glial cell, or an endothelial cell). APCs process antigens and present them to T cells. T cells may recognize these complexes using their T cell receptors (TCRs).

As used herein, the term "antigenic formulation" or "antigenic composition" or "immunogenic composition" refers to a preparation which, when administered to a vertebrate, especially a mammal, will induce an immune response.

As used herein, the term "chimeric antigen receptor (CAR)" refers to an artificial transmembrane protein receptor having an extracellular domain capable of binding to a predetermined CAR ligand or antigen, an intracellular segment having one or more cytoplasmic domains derived from signal transducing proteins different from the polypeptide from which the extracellular domain is derived, and a transmembrane domain. The "chimeric antigen receptor (CAR)" is sometimes called a "chimeric receptor", a "T-body", or a "chimeric immune receptor (CIR)." The phrase "CAR ligand" used interchangeably with "CAR antigen" means any natural or synthetic molecule (e.g., small molecule, protein, peptide, lipid, carbohydrate, nucleic acid) or part or fragment thereof that can specifically bind to the CAR. The "intracellular signaling domain" means any oligopeptide or polypeptide domain known to function to transmit a signal causing activation or inhibition of a biological process in a cell, for example, activation of an immune cell such as a B cell, a natural killer (NK) cell, a macrophage, a neutrophil, a dendritic cell, a mast cell, an eosinophil, or a basophil, or a T cell. Examples include CD79a, ILR chain, CD28 and/or CD3ζ.

The term "chimeric cytokine receptor" refers to an artificial transmembrane protein receptor including an extracellular domain having a target-binding domain, a transmembrane domain, and an intracellular cytokine receptor domain, which induces cytokine receptor signaling upon binding of the target to the target-binding domain. A "chimeric cytokine receptor target" refers to a ligand or target to which the extracellular domain of the chimeric cytokine receptor binds.

The term "chimeric co-stimulation receptor" refers to an artificial transmembrane protein receptor including an extracellular domain having a target-binding domain, a transmembrane domain, and a co-stimulatory domain, wherein binding of the target to the target-binding domain induces co-stimulation signaling. A "chimeric co-stimulation receptor target" refers to the ligand or target to which the extracellular domain of the chimeric cytokine receptor binds.

The term "synthetic Notch receptor" or "synNotch receptor" refers to an artificial transmembrane protein receptor based on the Notch receptor, which includes an extracellular domain having a target-binding domain, a Notch regulatory region, and an intracellular transcriptional domain. Transcriptional activation is induced by binding of the target to the target-binding domain. A "synthetic Notch receptor target" or "synNotch receptor target" refers to a ligand or target to which the extracellular domain of the synNotch receptor binds.

As used herein, "cancer antigen" refers to (i) tumor-specific antigens, (ii) tumor-associated antigens, (iii) cells that express tumor-specific antigens, (iv) cells that express tumor-associated antigens, (v) embryonic antigens on tumors, (vi) autologous tumor cells, (vii) tumor-specific membrane antigens, (viii) tumor-associated membrane antigens, (ix) growth factor receptors, (x) growth factor ligands, and (xi) any other type of antigen or antigen-presenting cell or material that is associated with a cancer.

As used herein, "CG oligodeoxynucleotides (CG ODNs)", also referred to as "CpG ODNs", are short single-stranded synthetic DNA molecules that contain a cytosine nucleotide (C) followed by a guanine nucleotide (G). In certain embodiments, the immunostimulatory oligonucleotide is a CG ODN.

As used herein, the term "co-stimulatory domain" refers to an intracellular signaling domain of a co-stimulatory molecule.

As used herein the term "co-stimulatory ligand" includes a molecule on an antigen presenting cell (e.g., an aAPC, dendritic cell, B cell, and the like) that specifically binds a cognate co-stimulatory molecule on a T cell, thereby providing a signal which, in addition to the primary signal provided by, for instance, binding of a TCR/CD3 complex with an MHC molecule loaded with peptide, mediates a T cell response, including, but not limited to, proliferation, activation, differentiation, and the like. A co-stimulatory ligand can include, but is not limited to, CD7, B7-1 (CD80), B7-2 (CD86), PD-L1, PD-L2, 4-1BBL, OX40L, inducible costimulatory ligand (ICOS-L), intercellular adhesion molecule (rCAM), CD30L, CD40, CD70, CD83, HLA-G, MICA, MICB, HVEM, lymphotoxin beta receptor, TR6, ILT3, ILT4, HVEM, an agonist or antibody that binds Toll ligand receptor and a ligand that specifically binds with B7-H3. A co-stimulatory ligand also encompasses, inter alia, an antibody that specifically binds with a co-stimulatory molecule present on a T cell, such as, but not limited to, CD27, CD28, 4-IBB, OX40, CD30, CD40, PD-1, 1COS, lymphocyte function-associated antigen-1 (LFA-1), CD2, CD7, LIGHT, NKG2C, B7-H3, and a ligand that specifically binds with CD83.

A "co-stimulatory molecule" refers to the cognate binding partner on a T cell that specifically binds with a co-stimulatory ligand, thereby mediating a co-stimulatory response by the T cell, such as, but not limited to, proliferation. Co-stimulatory molecules include, but are not limited to an MHC class I molecule, BTLA and a Toll ligand receptor.

A "co-stimulatory signal", as used herein, refers to a signal, which in combination with a primary signal, such as TCR/CD3 ligation, leads to T cell proliferation and/or upregulation or downregulation of key molecules.

A polypeptide or amino acid sequence "derived from" a designated polypeptide or protein refers to the origin of the polypeptide. Preferably, the polypeptide or amino acid sequence which is derived from a particular sequence has an amino acid sequence that is essentially identical to that sequence or a portion thereof, wherein the portion consists of at least 10-20 amino acids, preferably at least 20-30 amino acids, more preferably at least 30-50 amino acids, or which is otherwise identifiable to one of ordinary skill in the art as having its origin in the sequence.

Polypeptides derived from another peptide may have one or more mutations relative to the starting polypeptide, e.g., one or more amino acid residues which have been substituted with another amino acid residue or which has one or more amino acid residue insertions or deletions.

A polypeptide can comprise an amino acid sequence which is not naturally occurring. Such variants necessarily have less than 100% sequence identity or similarity with the starting molecule. In a preferred embodiment, the variant will have an amino acid sequence from about 75% to less than 100% amino acid sequence identity or similarity with the amino acid sequence of the starting polypeptide, more preferably from about 80% to less than 100%, more preferably from about 85% to less than 100%, more preferably from about 90% to less than 100% (e.g., 91%, 92%, 93%, 94%, 95%, 96%, 97%, 98%, 99%) and most preferably from about 95% to less than 100%, e.g., over the length of the variant molecule.

In one embodiment, there is one amino acid difference between a starting polypeptide sequence and the sequence derived therefrom. Identity or similarity with respect to this sequence is defined herein as the percentage of amino acid residues in the candidate sequence that are identical (i.e., same residue) with the starting amino acid residues, after aligning the sequences and introducing gaps, if necessary, to achieve the maximum percent sequence identity.

As used herein, "immune cell" is a cell of hematopoietic origin and that plays a role in the immune response. Immune cells include lymphocytes (e.g., B cells and T cells), natural killer (NK) cells, and myeloid cells (e.g., monocytes, macrophages, eosinophils, mast cells, basophils, and granulocytes).

As used herein, an "immunostimulatory oligonucleotide" is an oligonucleotide that can stimulate (e.g., induce or enhance) an immune response.

As used herein, "immune response" refers to a response made by the immune system of an organism to a substance, which includes but is not limited to foreign or self proteins. Three general types of "immune response" include mucosal, humoral, and cellular immune responses. For example, the immune response can include the activation, expansion, and/or increased proliferation of an immune cell. An immune response may also include at least one of the following: cytokine production, T cell activation and/or proliferation, granzyme or perform production, activation of antigen presenting cells or dendritic cells, antibody production, inflammation, developing immunity, developing hypersensitivity to an antigen, the response of antigen-specific lymphocytes to antigen, clearance of an infectious agent, and transplant or graft rejection.

The term "in vivo" refers to processes that occur in a living organism.

As used herein, the terms "linked," "fused," or "fusion" are used interchangeably. These terms refer to the joining together of two more elements or components or domains, by whatever means including chemical conjugation or recombinant means. Methods of chemical conjugation (e.g., using heterobifunctional crosslinking agents) are known in the art.

The term "mammal," "subject," or "patient," as used herein, includes both humans and non-humans and includes, but is not limited to, humans, non-human primates, canines, felines, murines, bovines, equines, and porcines.

"Nucleic acid" refers to deoxyribonucleotides or ribonucleotides and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g., degenerate codon substitutions) and complementary sequences and as well as the sequence explicitly indicated. Specifically, degenerate codon substitutions can be achieved by generating sequences in which the third position of one or more selected (or all) codons is substituted with mixed-base and/or deoxyinosine residues (Batzer et al., *Nucleic Acid Res.* 19:5081, 1991; Ohtsuka et al., *J. Biol. Chem.* 260:2605-2608, 1985); and Cassol et al., 1992; Rossolini et al., *Mol. Cell. Probes* 8:91-98, 1994). For arginine and leucine, modifications at the second base can also be conservative.

Polynucleotides of the present invention can be composed of any polyribonucleotide or polydeoxribonucleotide, which can be unmodified RNA or DNA or modified RNA or DNA. For example, polynucleotides can be composed of single- and double-stranded DNA, DNA that is a mixture of single- and double-stranded regions, single- and double-stranded RNA, and RNA that is mixture of single- and double-stranded regions, hybrid molecules including DNA and RNA that can be single-stranded or, more typically, double-stranded or a mixture of single- and double-stranded regions. In addition, the polynucleotide can be composed of triple-stranded regions having RNA or DNA or both RNA and DNA. A polynucleotide can also contain one or more modified bases or DNA or RNA backbones modified for stability or for other reasons. "Modified" bases include, for example, tritylated bases and unusual bases such as inosine. A variety of modifications can be made to DNA and RNA; thus, "polynucleotide" embraces chemically, enzymatically, or metabolically modified forms. In some embodiments, the peptides of the invention are encoded by a nucleotide sequence.

As generally used herein, "pharmaceutically acceptable" refers to those compounds, materials, compositions, and/or dosage forms which are, within the scope of sound medical judgment, suitable for use in contact with the tissues, organs, and/or bodily fluids of human beings and animals without excessive toxicity, irritation, allergic response, or other problems or complications commensurate with a reasonable benefit/risk ratio.

"Polypeptide," "peptide," and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

As used herein, a "signal peptide" or "signal sequence" refers to a peptide at the N-terminus of a newly synthesized protein that serves to direct a nascent protein into the endoplasmic reticulum. In some embodiments, the signal peptide is a CD8 or Igκ signal peptide.

As used herein, a "small molecule" is a molecule with a molecular weight below about 500 Daltons.

The term "sufficient amount" or "amount sufficient to" means an amount sufficient to produce a desired effect, e.g., an amount sufficient to reduce the diameter of a tumor.

The term "T cell" refers to a CD4+ T cell or a CD8+ T cell. The term T cell encompasses TH1 cells, TH2 cells and TH17 cells.

The term "T cell cytotoxicity" includes any immune response that is mediated by CD8+ T cell activation. Exemplary immune responses include cytokine production, CD8+ T cell proliferation, granzyme or perform production, and clearance of an infectious agent.

As used herein, the term "target-binding domain" of an extracellular domain refers to a polypeptide found on the outside of the cell that is sufficient to facilitate binding to a target. The target-binding domain will specifically bind to its binding partner, i.e., the target. As non-limiting examples, the target-binding domain can include an antigen-binding domain of an antibody, or a ligand, which recognizes and binds with a cognate binding partner protein. In this context, a ligand is a molecule that binds specifically to a portion of a protein and/or receptor. The cognate binding partner of a ligand useful in the methods and compositions described herein can generally be found on the surface of a cell. Ligand:cognate partner binding can result in the alteration of the ligand-bearing receptor, or activate a physiological response, for example, the activation of a signaling pathway. In one embodiment, the ligand can be non-native to the genome. Optionally, the ligand has a conserved function across at least two species.

A "therapeutic antibody" is an antibody, fragment of an antibody, or construct that is derived from an antibody, and can bind to a target or an antigen, such as a cell-surface antigen on a target cell to cause a therapeutic effect. Such antibodies can be chimeric, humanized or fully human antibodies. Methods are known in the art for producing such antibodies. Such antibodies include single chain Fc fragments of antibodies, minibodies and diabodies. Any of the therapeutic antibodies known in the art to be useful for cancer therapy can be used in combination therapy with the compositions described herein. Therapeutic antibodies may be monoclonal antibodies or polyclonal antibodies. In preferred embodiments, the therapeutic antibodies target cancer antigens.

As used herein, "therapeutic protein" refers to any polypeptide, protein, protein variant, fusion protein and/or fragment thereof which may be administered to a subject as a therapeutic.

The term "therapeutically effective amount" is an amount that is effective to ameliorate a symptom of a disease. A therapeutically effective amount can be a "prophylactically effective amount" as prophylaxis can be considered therapy.

As used herein, "transmembrane domain" refers to the portion of an engineered receptor (e.g., a CAR, a chimeric cytokine receptor, a chimeric co-stimulation receptor, or a synNotch receptor) that links the extracellular portion, optionally via a hinge domain, to the intracellular portion. As used herein, a "hinge/transmembrane domain" refers to a domain including both a hinge domain and a transmembrane domain.

As used herein, "vaccine" refers to a formulation which contains an amphiphilic ligand conjugate as described herein, combined with an adjuvant, which is in a form that is capable of being administered to a vertebrate and which induces a protective immune response sufficient to induce immunity to prevent and/or ameliorate an infection or disease and/or to reduce at least one symptom of an infection or disease and/or to enhance the efficacy of another dose of the synthetic nanoparticle. Typically, the vaccine includes a conventional saline or buffered aqueous solution medium in which a composition as described herein is suspended or dissolved. In this form, a composition as described herein is used to prevent, ameliorate, or otherwise treat an infection or disease. Upon introduction into a host, the vaccine provokes an immune response including, but not limited to, the production of antibodies and/or cytokines and/or the activation of cytotoxic T cells, antigen presenting cells, helper T cells, dendritic cells and/or other cellular responses.

DETAILED DESCRIPTION OF THE INVENTION

Described herein are methods for stimulating an immune response to a target cell population in a subject, where the methods include administering to the subject a composition including an amphiphilic lipid conjugate. The subject can be receiving, have received, or will receive immunotherapy with an immune cell including a chimeric antigen receptor (CAR), an immune cell including a chimeric cytokine receptor, an immune cell including a chimeric co-stimulation receptor, and/or an immune cell including a synthetic Notch (syn Notch) receptor. Such methods are useful for, e.g., treating a (human) subject with cancer. Also provided are compositions of amphiphilic ligand conjugates including two or more cargos.

In particular, described herein are amphiphilic ligand conjugates including two or more CAR ligands, chimeric cytokine receptor targets, chimeric co-stimulation receptor targets, or synNotch receptor targets. Also described are amphiphilic ligand conjugates including two or more any combination of CAR ligands, chimeric cytokine receptor targets, chimeric co-stimulation receptor targets, and synNotch receptor targets.

Amphiphilic Conjugates

In certain embodiments, amphiphilic conjugates are used with chimeric antigen receptor (CAR) expressing, chimeric cytokine receptor expressing, chimeric co-stimulation receptor expressing, or synNotch receptor expressing cell therapy. In certain embodiments, if the subject is receiving cell therapy with an immune cell including a CAR, the immune cell is not a T cell. In some embodiments, the amphiphilic conjugate stimulates a specific immune response against a specific target, such as a tumor-associated antigen. In some embodiments, the amphiphilic conjugate induces activation, expansion, or proliferation of an immune cell expressing a CAR, a chimeric cytokine receptor, a chimeric co-stimulation receptor, or a synNotch receptor in vivo. In some embodiments, the amphiphilic conjugate includes a CAR ligand, a chimeric cytokine receptor target, a chimeric co-stimulation receptor target or a synNotch receptor target, and is referred to herein as an "amphiphilic ligand conjugate." In some embodiments, the amphiphilic conjugate includes an immunostimulatory oligonucleotide and is referred to herein as an "amphiphilic oligonucleotide conjugate."

The structure of an amphiphilic ligand conjugate as described herein includes a lipophilic moiety, or "lipid tail", (e.g., DSPE) covalently linked, optionally via a linker (e.g., PEG-2000), to one or more cargos. The amphiphilic ligand conjugate cargo can include a CAR ligand, a chimeric cytokine receptor target, a chimeric co-stimulation receptor target, or a synNotch receptor target. The modularity of this design allows for various ligands including, but not limited to, small molecules (e.g., fluorescein isothiocyanate (FITC)), short peptides (e.g., a linear peptide providing an epitope specific for a CAR, a chimeric cytokine receptor, a chimeric co-stimulation receptor, or a synNotch receptor), or modular protein domains (e.g., folded polypeptide or polypeptide fragment providing a conformational epitope specific for a CAR, a chimeric cytokine receptor, a chimeric co-stimulation receptor, or a synNotch receptor), or any one of the CAR ligands, chimeric cytokine receptor targets, chimeric co-stimulation receptor targets, or synNotch receptor targets described herein, to be covalently linked to the lipid, resulting in amphiphilic ligand conjugates with tailored specificity.

Upon administration, without being bound by theory, the amphiphilic ligand conjugate is thought to be delivered to lymph nodes where the lipid tail portion is inserted into the membrane of antigen presenting cells (APCs), resulting in the decoration of the APC with ligands. The embedded ligands function as specific targets for an engineered receptor (i.e., a CAR, a chimeric cytokine receptor, a chimeric co-stimulation receptor, or a synNotch receptor) expressed on the surface of prior, subsequent or co-administered immune cells expressing said receptor, resulting in the recruitment of the immune cells to the ligand-decorated APCs. Interaction of the engineered receptor with the embedded ligand provides a stimulatory signal through the engineered receptor while the APC additionally presents other naturally occurring co-stimulatory signals, resulting in optimal immune cell activation, prolonged survival and efficient memory formation.

Lipid Conjugates

In certain embodiments, a lipid conjugate (e.g., an amphiphilic conjugate), as described in US 2013/0295129, herein incorporated by reference in its entirety, is used in the methods disclosed herein. A lipid conjugate includes an albumin-binding lipid and a cargo to efficiently target the cargo to lymph nodes in vivo. Lipid conjugates bind to endogenous albumin, which targets them to lymphatics and draining lymph nodes where they accumulate due to the filtering of albumin by antigen presenting cells. In some embodiments, the lipid conjugate includes an antigenic peptide or molecular adjuvant, and thereby induces or enhances a robust immune response. In some embodiments, the lipid conjugate includes a CAR ligand, a chimeric cytokine receptor target, a chimeric co-stimulation receptor target, or a synNotch receptor target, and thereby induces or enhances expansion, proliferation, and/or activation of immune cells expressing a CAR, a chimeric cytokine receptor, a chimeric co-stimulation receptor, or a synNotch receptor.

Lymph node-targeting conjugates typically include three domains: a highly lipophilic, albumin-binding domain (e.g., an albumin-binding lipid), a cargo such as a CAR ligand, a chimeric cytokine receptor target, a chimeric co-stimulation receptor target, a synNotch receptor target, or molecular adjuvant, and a polar block linker, which promotes solubility of the conjugate and reduces the ability of the lipid to insert into cellular plasma membranes. Accordingly, in certain embodiments, the general structure of the conjugate is L-P-C, where "L" is an albumin-binding lipid, "P" is a polar block, and "C" is a cargo such as a CAR ligand, a chimeric cytokine receptor target, a chimeric co-stimulation receptor target, a synNotch receptor target, or a molecular adjuvant. In some embodiments, the cargo itself can also serve as the polar block domain, and a separate polar block domain is not required. Therefore, in certain embodiments the conjugate has only two domains: an albumin-binding lipid and a cargo.

In some embodiments, the cargo of the conjugate is a CAR ligand. In other embodiments, the cargo of the conjugate is a chimeric cytokine receptor target. In further embodiments, the cargo of the conjugate is a chimeric co-stimulation receptor target. In yet other embodiments, the cargo of the conjugate is a synNotch receptor target. In some embodiments, the amphiphilic ligand conjugate is administered or formulated with an adjuvant, wherein the adjuvant is an amphiphilic ligand having a molecular adjuvant such as an immunostimulatory oligonucleotide, or a peptide antigen, as the cargo.

Lipids

The conjugates typically include a hydrophobic lipid. The lipid can be linear, branched, or cyclic. In certain embodiments, the activity relies, in part, on the ability of the conjugate to insert itself into a cell membrane. Therefore, lymph node-targeted conjugates typically include a lipid that undergo membrane insertion under physiological conditions. Lipids suitable for membrane insertion can be selected based on the ability of the lipid or a lipid conjugate including the lipid to bind to interact with a cell membrane. Suitable methods for testing the membrane insertion of the lipid or lipid conjugate are known in the art.

Examples of preferred lipids for use in lymph node targeting lipid conjugates include, but are not limited to, fatty acids with aliphatic tails of 3-30 carbons including, but not limited to, linear unsaturated and saturated fatty acids, branched saturated and unsaturated fatty acids, and fatty acids derivatives, such as fatty acid esters, fatty acid amides, and fatty acid thioesters, diacyl lipids, cholesterol, cholesterol derivatives, and steroid acids such as bile acids, Lipid A or combinations thereof.

In certain embodiments, the lipid is a diacyl lipid or two-tailed lipid. In some embodiments, the tails in the diacyl lipid contain from about 3 to about 30 carbons and can be saturated, unsaturated, or combinations thereof. The tails can be coupled to the head group via ester bond linkages, amide bond linkages, thioester bond linkages, or combinations thereof. In a particular embodiment, the diacyl lipids are phosphate lipids, glycolipids, sphingolipids, or combinations thereof.

Preferably, membrane-inserting conjugates include a lipid that is 10 or fewer carbon units in length, as it is believed that increasing the number of lipid units can reduce insertion of the lipid into plasma membrane of cells, allowing the lipid conjugate to remain free to bind albumin and traffic to the lymph node.

Molecular Adjuvants

In certain embodiments, amphiphilic oligonucleotide conjugates are used with the amphiphilic ligand conjugate. The oligonucleotide conjugates typically contain an immunostimulatory oligonucleotide.

In certain embodiments, the immunostimulatory oligonucleotide can serve as a ligand for pattern recognition receptors (PRRs). Examples of PRRs include the Toll-like family of signaling molecules that play a role in the initiation of innate immune responses and also influence the later and more antigen specific adaptive immune responses. Therefore, the oligonucleotide can serve as a ligand for a Toll-like family signaling molecule, such as Toll-Like Receptor 9 (TLR9).

For example, unmethylated CpG sites can be detected by TLR9 on plasmacytoid dendritic cells and B cells in humans (Zaida, et al., *Infection and Immunity*, 76(5):2123-2129, (2008)). Therefore, the sequence of oligonucleotide can include one or more unmethylated cytosine-guanine (CG or CpG, used interchangeably) dinucleotide motifs. The 'p' refers to the phosphodiester backbone of DNA, as discussed in more detail below, some oligonucleotides including CG can have a modified backbone, for example a phosphorothioate (PS) backbone.

In certain embodiments, an immunostimulatory oligonucleotide can contain more than one CG dinucleotide, arranged either contiguously or separated by intervening nucleotide(s). The CpG motif(s) can be in the interior of the oligonucleotide sequence. Numerous nucleotide sequences stimulate TLR9 with variations in the number and location of CG dinucleotide(s), as well as the precise base sequences flanking the CG dimers.

Typically, CG ODNs are classified based on their sequence, secondary structures, and effect on human peripheral blood mononuclear cells (PBMCs). The five classes are Class A (Type D), Class B (Type K), Class C, Class P, and Class S (Vollmer, J & Krieg, A M, *Advanced drug delivery reviews* 61(3): 195-204 (2009), incorporated herein by reference). CG ODNs can stimulate the production of Type I interferons (e.g., IFNα) and induce the maturation of dendritic cells (DCs). Some classes of ODNs are also strong activators of natural killer (NK) cells through indirect cytokine signaling. Some classes are strong stimulators of human B cell and monocyte maturation (Weiner, G L, PNAS USA 94(20): 10833-7 (1997); Dalpke, A H, Immunology 106(1): 102-12 (2002); Hartmann, G, J of Immun. 164(3): 1617-2 (2000), each of which is incorporated herein by reference).

According to some embodiments, a lipophilic-CpG oligonucleotide conjugate is used to enhance an immune response to an antigen. The lipophilic-CpG oligonucleotide is represented by the following, wherein "L" is a lipophilic compound, such as diacyl lipid, "$G_n$" is a guanine repeat linker and "n" represents 1, 2, 3, 4, or 5.

(SEQ ID NO: 1)
5'-L-G$_n$TCCATGACGTTCCTGACGTT-3'

Other PRR Toll-like receptors include TLR3, and TLR7 which may recognize double-stranded RNA, single-stranded and short double-stranded RNAs, respectively, and retinoic acid-inducible gene I (RIG-I)-like receptors, namely RIG-I and melanoma differentiation-associated gene 5 (MDA5), which are best known as RNA-sensing receptors in the cytosol. Therefore, in certain embodiments, the oligonucleotide contains a functional ligand for TLR3, TLR7, or RIG-I-like receptors, or combinations thereof.

Examples of immunostimulatory oligonucleotides, and methods of making them are known in the art, see for example, Bodera, P. *Recent Pat Inflamm Allergy Drug Discov.* 5(1):87-93 (2011), incorporated herein by reference.

In certain embodiments, the oligonucleotide cargo includes two or more immunostimulatory sequences.

The oligonucleotide can be between 2-100 nucleotide bases in length, including for example, 5 nucleotide bases in length, 10 nucleotide bases in length, 15 nucleotide bases in length, 20 nucleotide bases in length, 25 nucleotide bases in length, 30 nucleotide bases in length, 35 nucleotide bases in length, 40 nucleotide bases in length, 45 nucleotide bases in length, 50 nucleotide bases in length, 60 nucleotide bases in length, 70 nucleotide bases in length, 80 nucleotide bases in length, 90 nucleotide bases in length, 95 nucleotide bases in length, 98 nucleotide bases in length, 100 nucleotide bases in length or more.

The 3' end or the 5' end of the oligonucleotides can be conjugated to the polar block or the lipid. In certain embodiments the 5' end of the oligonucleotide is linked to the polar block or the lipid.

The oligonucleotides can be DNA or RNA nucleotides which typically include a heterocyclic base (nucleic acid base), a sugar moiety attached to the heterocyclic base, and a phosphate moiety which esterifies a hydroxyl function of the sugar moiety. The principal naturally-occurring nucleotides include uracil, thymine, cytosine, adenine and guanine as the heterocyclic bases, and ribose or deoxyribose sugar linked by phosphodiester bonds. In certain embodiments, the oligonucleotides are composed of nucleotide analogs that have been chemically modified to improve stability, half-life, or specificity or affinity for a target receptor, relative to a DNA or RNA counterpart. The chemical modifications include chemical modification of nucleobases, sugar moieties, nucleotide linkages, or combinations thereof. As used herein 'modified nucleotide" or "chemically modified nucleotide" defines a nucleotide that has a chemical modification of one or more of the heterocyclic base, sugar moiety or phosphate moiety constituents. In certain embodiments, the charge of the modified nucleotide is reduced compared to DNA or RNA oligonucleotides of the same nucleobase sequence. For example, the oligonucleotide can have low negative charge, no charge, or positive charge.

Typically, nucleoside analogs support bases capable of hydrogen bonding by Watson-Crick base pairing to standard polynucleotide bases, where the analog backbone presents the bases in a manner to permit such hydrogen bonding in a sequence-specific fashion between the oligonucleotide analog molecule and bases in a standard polynucleotide (e.g., single-stranded RNA or single-stranded DNA). In certain embodiments, the analogs have a substantially uncharged, phosphorus containing backbone.

Amphiphilic Ligand Conjugate Cargos

In some embodiments, the amphiphilic ligand conjugate cargo is an antigenic protein or polypeptide, such as a tumor-associated antigen or portion thereof. In some embodiments, the amphiphilic ligand conjugate cargo is a small molecule, peptide or protein domain, or fragment thereof. In some embodiments, the amphiphilic ligand conjugate cargo is a dimerizing agent, a tumor associated antigen, a hapten, a fluorophore, a peptide mimotope, or a tag. In some embodiments, the amphiphilic ligand conjugate binds to a CAR, a chimeric cytokine receptor, a chimeric co-stimulation receptor, or a synNotch receptor expressed by an immune cell. Accordingly, the methods and compositions described herein utilize an amphiphilic ligand conjugate complementary to a CAR expressing cell (i.e., not a T cell), a chimeric cytokine receptor expressing cell, a chimeric co-stimulation receptor expressing cell, and/or a synNotch receptor expressing cell.

The peptide can be 2-100 amino acids, including for example, 5 amino acids, 10 amino acids, 15 amino acids, 20 amino acids, 25 amino acids, 30 amino acids, 35 amino acids, 40 amino acids, 45 amino acids, or 50 amino acids. In some embodiments, a peptide can be greater than 50 amino acids. In some embodiments, the peptide can be >100 amino acids.

A protein/peptide can be linear, branched or cyclic. The peptide can include D amino acids, L amino acids, or a combination thereof. The peptide or protein can be conjugated to the polar block or lipid at the N-terminus or the C-terminus of the peptide or protein.

The protein or polypeptide can be any protein or peptide that can induce or increase the ability of the immune system to develop antibodies and T-cell responses to the protein or peptide.

A CAR ligand of an amphiphilic ligand conjugate described herein can be a tumor associated antigen, a hapten, a fluorophore, a peptide mimotope, or a tag. A chimeric cytokine receptor target of an amphiphilic ligand conjugate described herein can be a dimerizing agent, a tumor associated antigen, a hapten, a fluorophore, a peptide mimotope, or a tag. A chimeric co-stimulation receptor target of an amphiphilic ligand conjugate described herein can be a dimerizing agent, a tumor associated antigen, a hapten, a fluorophore, a peptide mimotope, or a tag. A synNotch receptor target of an amphiphilic ligand conjugate described herein can be a tumor associated antigen, a hapten, a fluorophore, a peptide mimotope, or a tag.

Cancer and Tumor-Associated Antigens

A cancer antigen is an antigen that is typically expressed preferentially by cancer cells (i.e., it is expressed at higher levels in cancer cells than on non-cancer cells) and in some instances it is expressed solely by cancer cells. In some embodiments, the cancer antigen is a tumor-associated antigen. The cancer antigen may be expressed within a cancer cell or on the surface of the cancer cell. The cancer antigen can be, but is not limited to, CD19, TRP-1, TRP-2, MART-1/Melan-A, gp100, adenosine deaminase-binding protein (ADAbp), FAP, cyclophilin b, colorectal associated antigen (CRC)-C017-1A/GA733, carcinoembryonic antigen (CEA), CAP-1, CAP-2, etv6, AML1, prostate specific antigen (PSA), PSA-1, PSA-2, PSA-3, prostate-specific membrane antigen (PSMA), T cell receptor/CD3-zeta chain, and CD20. The cancer antigen may be selected from the group consisting of MAGE-A1, MAGE-A2, MAGE-A3, MAGE-A4, MAGE-A5, MAGE-A6, MAGE-A7, MAGE-A8, MAGE-A9, MAGE-A10, MAGE-A11, MAGE-A12, MAGE-Xp2 (MAGE-B2), MAGE-Xp3 (MAGE-B3), MAGE-Xp4 (MAGE-B4), MAGE-C1, MAGE-C2, MAGE-C3, MAGE-C4, MAGE-05), GAGE-1, GAGE-2, GAGE-3, GAGE-4, GAGE-5, GAGE-6, GAGE-7, GAGE-8, GAGE-9, BAGE, RAGE, LAGE-1, NAG, GnT-V, MUM-1, CDK4, tyrosinase, p53, MUC family, HER2/neu, p21ras, RCAS1, α-fetoprotein, E-cadherin, α-catenin, β-catenin, γ-catenin, p120ctn, gp100Pme1117, PRAME, NY-ESO-1, cdc27, adenomatous polyposis coli protein (APC), fodrin, Connexin 37, Ig-idiotype, p15, gp75, GM2 ganglioside, GD2 ganglioside, human papilloma virus proteins, Smad family of tumor antigens, lmp-1, P1A, EBV-encoded nuclear antigen (EBNA)-1, brain glycogen phosphorylase, SSX-1, SSX-2 (HOM-MEL-40), SSX-1, SSX-4, SSX-5, SCP-1 and CT-7, CD20, or c-erbB-2.

In some embodiments, the methods and compositions of the disclosure are used in combination with Kymriah™ (tisagenlecleucel; Novartis) suspension for intravenous infusion, formerly CTL019. For example, in one embodiment, a composition of the disclosure includes an amphiphilic ligand conjugate in which the CAR ligand is CD19, or an antigenic portion thereof. Such compositions can be administered to subjects in combination with a CD19-specific CAR-T cell (e.g., a population of CD19-specific CAR-T cells), such as Kymriah™ (tisagenlecleucel; Novartis), for treatment of cancer, for example, B-cell acute lymphoblastic leukemia (ALL).

Suitable antigens are known in the art and are available from commercial government and scientific sources. In certain embodiments, the antigens are whole inactivated or irradiated tumor cells. The antigens may be purified or partially purified polypeptides derived from tumors. The antigens can be recombinant polypeptides produced by expressing DNA encoding the polypeptide antigen in a heterologous expression system. The antigens can be DNA encoding all or part of an antigenic protein. The DNA may be in the form of vector DNA such as plasmid DNA.

In certain embodiments, antigens may be provided as single antigens or may be provided in combination. Antigens may also be provided as complex mixtures of polypeptides or nucleic acids.

Haptens

The amphiphilic ligand conjugates described herein may include a hapten as cargo. A hapten is a small molecule that is capable of eliciting an immune response once attached to a large carrier molecule, such as a protein. Exemplary haptens include, but are not limited to, uruhshiol, hydralazine, halothane, fluorescein, biotin, digoxigenin, dinitrophenol, aminobenzoic acid, as well as drugs such as penicillin, diclofenac, ibuprofen, levodopa, mefenamic acid, methyldopa, procainamide, cephalosporins, tetracycline, and tolbutamide. Other haptens known in the art may also be used for the amphiphilic ligand conjugates described herein.

Fluorophores

The amphiphilic ligand conjugates described herein may include a fluorophore as cargo. A fluorophore is a fluorescent chemical compound that can re-emit light upon light excitation. Examples of fluorophores include, but are not limited to, fluorescein isothiocyanate (FITC), rhodamine, eosin, cyanine, indocarbocyanine, oxacarbocyanine, thiacarbocyanine, merocyanine, squaranine derivatives, naphthalene derivatives, hydroxycoumarin, aminocoumarin, methoxycoumarin, pyridyloxazole, nitrobenzoxadiazole, benzoxadiazole, anthraquinone, cascade blue, Nile red, Nile blue, cresyl violet, oxazine 170, proflavin, acridine orange, acridine yellow, auramine, crystal violet, malachite green, porphin, phthalocyanine, and bilirubin. Further fluorophores described in the art may also be useful for the amphiphilic ligand conjugates described herein.

Peptide Mimotopes

Another exemplary cargo of the amphiphilic ligand conjugates described herein is a peptide mimotope. A peptide mimotope is a peptide that mimics the structure of an epitope to which an antibody or antibody fragment can bind. Peptide mimotopes useful for the amphiphilic ligand conjugates described herein can be generated according to methods known in the art and can be generated for a number of molecules, such as one of the cancer antigens described above.

Tags

In some embodiments, cargo of the amphiphilic ligand conjugate is a tag. In some embodiments, the tag is FITC, streptavidin, biotin, dinitrophenol, peridinin chlorophyll protein complex, green fluorescent protein, phycoerythrin (PE), horse radish peroxidase, a palmitoyl group, a nitrosyl group, alkaline phosphatase, glucose oxidase, or maltose binding protein. Other tags known in the art may also be used for the amphiphilic ligand conjugates described herein.

In some embodiments, the amphiphilic ligand conjugate includes a CAR ligand selected from one of the following: a tumor associated antigen, a hapten, a fluorophore, a peptide mimotope, or a tag. In some embodiments, the tag is FITC, streptavidin, biotin, dinitrophenol, peridinin chlorophyll protein complex, green fluorescent protein, phycoerythrin (PE), horse radish peroxidase, a palmitoyl group, a nitrosyl group, alkaline phosphatase, glucose oxidase, or maltose binding protein. In particular embodiments, the CAR ligand is FITC.

In some embodiments, the amphiphilic ligand conjugate includes a chimeric cytokine receptor target selected from one of the following: a dimerizing agent, a tumor associated antigen, a hapten, a fluorophore, a peptide mimotope, or a tag. The amphiphilic ligand conjugate may also include two chimeric cytokine receptor targets, each selected from one of the following: a dimerizing agent, a tumor associated antigen, a hapten, a fluorophore, a peptide mimotope, or a tag. In some embodiments, the dimerizing agent is FK506, rimiducid, rapamycin, AP20187, AP1903, or AP21967. In other embodiments, the tag is FITC, streptavidin, biotin, dinitrophenol, peridinin chlorophyll protein complex, green fluorescent protein, PE, horse radish peroxidase, a palmitoyl group, a nitrosyl group, alkaline phosphatase, glucose oxidase, or maltose binding protein. In particular embodiments, the chimeric cytokine receptor target(s) is FITC, biotin, FK506, and/or rapamycin. One exemplary amphiphilic ligand conjugate includes FITC as the chimeric cytokine receptor target. In another example, the amphiphilic ligand conjugate includes FK506 and rapamycin as the chimeric cytokine receptor targets. In further embodiments, the amphiphilic ligand conjugate includes FITC and biotin as the chimeric cytokine receptor targets. In a further embodiment, the amphiphilic ligand conjugate includes FITC and AP20187 as the chimeric cytokine receptor targets. In another embodiment, the amphiphilic ligand conjugate includes FITC and AP1903 as the chimeric cytokine receptor targets. In yet another embodiment, the amphiphilic ligand conjugate includes FITC and AP21967 as the chimeric cytokine receptor targets.

In some embodiments, the amphiphilic ligand conjugate includes a chimeric co-stimulation receptor target selected from one of the following: a dimerizing agent, a tumor associated antigen, a hapten, a fluorophore, a peptide mimotope, or a tag. The amphiphilic ligand conjugate may also include two chimeric co-stimulation receptor targets, each selected from one of the following: a dimerizing agent, a tumor associated antigen, a hapten, a fluorophore, a peptide mimotope, or a tag. In some embodiments, the chimeric cytokine receptor target is FK506, rimiducid, rapamycin, AP20187, AP1903, or AP21967. In other embodiments, the chimeric cytokine receptor target is FITC, streptavidin, biotin, dinitrophenol, peridinin chlorophyll protein complex, green fluorescent protein, PE, horse radish peroxidase, a palmitoyl group, a nitrosyl group, alkaline phosphatase, glucose oxidase, or maltose binding protein. In one embodiment, the amphiphilic ligand conjugate includes FITC as the chimeric co-stimulation receptor target. In another embodiment, the amphiphilic ligand conjugate includes rimiducid as the chimeric co-stimulation receptor target.

In further embodiments, the amphiphilic ligand conjugate includes a synNotch receptor target selected from a tumor associated antigen, a hapten, a fluorophore, a peptide mimotope, or a tag. In some embodiments, the synNotch receptor target is FITC, streptavidin, biotin, dinitrophenol, peridinin chlorophyll protein complex, green fluorescent protein, PE, horse radish peroxidase, a palmitoyl group, a nitrosyl group, alkaline phosphatase, glucose oxidase, or maltose binding protein. In one example, the synNotch receptor target is FITC.

Polar Block/Linker

For the conjugate to be trafficked efficiently to the lymph node, the conjugate should remain soluble at the injection site. Therefore, a polar block linker can be included between the cargo and the lipid to increase solubility of the conjugate. The polar block can also reduce or prevent the ability of cargo, such as synthetic oligonucleotides containing a PS backbone, from non-specifically associating with extracellular matrix proteins at the site of administration. The polar block increases the solubility of the conjugate without preventing its ability to bind to albumin. It is believed that this combination of characteristics allows the conjugate to bind to albumin present in the serum or interstitial fluid, and remain in circulation until the albumin is trafficked to, and retained in a lymph node.

The length and composition of the polar block can be adjusted based on the lipid and cargo selected. For example, for oligonucleotide conjugates, the oligonucleotide itself may be polar enough to insure solubility of the conjugate, for example, oligonucleotides that are 10, 15, 20 or more nucleotides in length. Therefore, in certain embodiments, no additional polar block linker is required. However, depending on the amino acid sequence, some lipidated peptides can be essentially insoluble. In these cases, it can be desirable to include a polar block that mimics the effect of a polar oligonucleotide.

A polar block can be used as part of any of lipid conjugates suitable for use in the methods disclosed herein, for example, amphiphilic oligonucleotide conjugates and amphiphilic ligand conjugates, which reduce cell membrane insertion/preferential portioning on albumin. Suitable polar blocks include, but are not limited to, oligonucleotides such as those discussed above, a hydrophilic polymer including but not limited to poly(ethylene glycol) (MW: 500 Da to 20,000 Da), polyacrylamide (MW: 500 Da to 20,000 Da), polyacrylic acid; a string of hydrophilic amino acids such as serine, threonine, cysteine, tyrosine, asparagine, glutamine, aspartic acid, glutamic acid, lysine, arginine, histidine, or combinations thereof polysaccharides, including but not limited to, dextran (MW: 1,000 Da to 2,000,000 Da), or combinations thereof.

The hydrophobic lipid and the linker/cargo are covalently linked. The covalent bond may be a non-cleavable linkage or a cleavable linkage. The non-cleavable linkage can include an amide bond or phosphate bond, and the cleavable linkage can include a disulfide bond, acid-cleavable linkage, ester bond, anhydride bond, biodegradable bond, or enzyme-cleavable linkage.

Ethylene Glycol Linkers

In certain embodiments, the polar block is one or more ethylene glycol (EG) units, more preferably two or more EG units (i.e., polyethylene glycol (PEG)). For example, in certain embodiments, a lipid conjugate includes a protein or peptide (e.g., peptide antigen) and a hydrophobic lipid linked by a polyethylene glycol (PEG) molecule or a derivative or analog thereof.

In certain embodiments, protein conjugates suitable for use in the methods disclosed herein contain protein antigen linked to PEG which is in turn linked to a hydrophobic lipid, or lipid-Gn-ON conjugates, either covalently or via formation of protein-oligo conjugates that hybridize to oligo micelles. The precise number of EG units depends on the lipid and the cargo, however, typically, a polar block can have between about 1 and about 100, between about 20 and about 80, between about 30 and about 70, or between about 40 and about 60 EG units. In certain embodiments, the polar block has between about 45 and 55 EG, units. For example, in certain embodiments, the polar block has 48 EG units.

Oligonucleotide Linkers

As discussed above, in certain embodiments, the polar block is an oligonucleotide. The polar block linker can have any sequence, for example, the sequence of the oligonucleotide can be a random sequence, or a sequence specifically chosen for its molecular or biochemical properties (e.g., highly polar). In certain embodiments, the polar block linker includes one or more series of consecutive adenine (A), cytosine (C), guanine (G), thymine (T), uracil (U), or analog thereof. In certain embodiments, the polar block linker consists of a series of consecutive adenine (A), cytosine (C), guanine (G), thymine (T), uracil (U), or analog thereof.

In certain embodiments, the linker is one or more guanines, for example between 1-10 guanines. It has been discovered that altering the number of guanines between a cargo such as a CpG oligonucleotide, and a lipid tail controls micelle stability in the presence of serum proteins. Therefore, the number of guanines in the linker can be selected based on the desired affinity of the conjugate for serum proteins such as albumin. When the cargo is a CpG immunostimulatory oligonucleotide and the lipid tail is a diacyl lipid, the number of guanines affects the ability of micelles formed in aqueous solution to dissociate in the presence of serum: 20% of the non-stabilized micelles (lipo-$G_0T_{10}$-CG) were intact, while the remaining 80% were disrupted and bonded with FBS components. In the presence of guanines, the percentage of intact micelles increased from 36% (lipo-$G_2T_8$-CG) to 73% (lipo-$G_4T_6$-CG), and finally reached 90% (lipo-$G_6T_4$-CG). Increasing the number of guanines to eight (lipo-$G_8T_2$-CG) and ten (lipo-$G_{10}T_0$-CG) did not further enhance micelle stability.

In certain embodiments, the linker in a lymph node-targeting conjugate suitable for use in the methods disclosed herein can include 0, 1, or 2 guanines. Linkers that include 3 or more consecutive guanines can be used to form micelle-stabilizing conjugates with properties that are suitable for use in the methods disclosed herein.

Immunogenic Compositions

The conjugates suitable for use in the methods disclosed herein can be used in immunogenic compositions or as components in vaccines. Typically, immunogenic compositions disclosed herein include an adjuvant, an antigen, or a combination thereof. The combination of an adjuvant and an antigen can be referred to as a vaccine. When administered to a subject in combination, the adjuvant and antigen can be administered in separate pharmaceutical compositions, or they can be administered together in the same pharmaceutical composition. When administered in combination, the adjuvant can be a lipid conjugate, the antigen can be a lipid conjugate, or the adjuvant and the antigen can both be lipid conjugates.

An immunogenic composition suitable for use in the methods disclosed herein can include an amphiphilic ligand conjugate that is an antigen, administered alone, or in combination with an adjuvant. The adjuvant may be without limitation alum (e.g., aluminum hydroxide, aluminum phosphate); saponins purified from the bark of the *Q. saponaria* tree such as QS21 (a glycolipid that elutes in the 21st peak with HPLC fractionation; Antigenics, Inc., Worcester, Mass.); poly[di(carboxylatophenoxy)phosphazene (PCPP polymer; Virus Research Institute, USA), Flt3 ligand, *Leishmania* elongation factor (a purified *Leishmania* protein; Corixa Corporation, Seattle, Wash.), ISCOMS (immunostimulating complexes which contain mixed saponins, lipids and form virus-sized particles with pores that can hold antigen; CSL, Melbourne, Australia), Pam3Cys, SB-AS4 (SmithKline Beecham adjuvant system #4 which contains alum and MPL; SBB, Belgium), non-ionic block copolymers that form micelles such as CRL 1005 (these contain a linear chain of hydrophobic polyoxypropylene flanked by chains of polyoxyethylene, Vaxcel, Inc., Norcross, Ga.), and Montanide IMS (e.g., IMS 1312, water-based nanoparticles combined with a soluble immunostimulant, Seppic).

Adjuvants may be TLR ligands, such as those discussed above. Adjuvants that act through TLR3 include, without limitation, double-stranded RNA. Adjuvants that act through TLR4 include, without limitation, derivatives of lipopolysaccharides such as monophosphoryl lipid A (MPLA; Ribi ImmunoChem Research, Inc., Hamilton, Mont.) and muramyl dipeptide (MDP; Ribi) and threonyl-muramyl dipeptide (t-MDP; Ribi); OM-174 (a glucosamine disaccharide related to lipid A; OM Pharma SA, Meyrin, Switzerland). Adjuvants that act through TLR5 include, without limitation, flagellin. Adjuvants that act through TLR7 and/or TLR8 include single-stranded RNA, oligoribonucleotides (ORN), synthetic low molecular weight compounds such as imidazoquinolinamines (e.g., imiquimod (R-837), resiquimod (R-848)). Adjuvants acting through TLR9 include DNA of viral or bacterial origin, or synthetic oligodeoxynucleotides (ODN), such as CpG ODN. Another adjuvant class is phosphorothioate containing molecules such as phosphorothioate nucleotide analogs and nucleic acids containing phosphorothioate backbone linkages.

The adjuvant can also be oil emulsions (e.g., Freund's adjuvant); saponin formulations; virosomes and viral-like particles; bacterial and microbial derivatives; immunostimulatory oligonucleotides; ADP-ribosylating toxins and detoxified derivatives; alum; BCG; mineral-containing compositions (e.g., mineral salts, such as aluminium salts and calcium salts, hydroxides, phosphates, sulfates, etc.); bioadhesives and/or mucoadhesives; microparticles; liposomes; polyoxyethylene ether and polyoxyethylene ester formulations; polyphosphazene; muramyl peptides; imidazoquinolone compounds; and surface active substances (e.g., lysolecithin, pluronic polyols, polyanions, peptides, oil emulsions, keyhole limpet hemocyanin, and dinitrophenol).

Adjuvants may also include immunomodulators such as cytokines, interleukins (e.g., IL-1, IL-2, IL-4, IL-5, IL-6, IL-7, IL-12, etc.), interferons (e.g., interferon-.gamma.), macrophage colony stimulating factor, and tumor necrosis factor.

In some embodiments, the adjuvant is an amphiphilic oligonucleotide conjugate including an immunostimulatory oligonucleotide, as described supra.

Chimeric Antigen Receptors (CARs)

A chimeric antigen receptor (CAR) described herein includes an extracellular domain including a target-binding domain, a transmembrane domain (optionally including a hinge), and an intracellular signaling domain. In some embodiments, the CAR further includes an optional co-stimulatory domain.

In one embodiment, the chimeric extracellular target-binding domain includes the antigen-binding domain(s) of an antibody that specifically binds an antigen expressed on a cell to be targeted for an immune cell (a T cell, a TIL (e.g., T cell, B cell, or an NK cell), an NK cell, an NKT cell, a gdT cell, a macrophage, a neutrophil, a dendritic cell, a mast cell, an eosinophil, or a basophil) response. The properties of the intracellular signaling domain(s) of the CAR can vary as known in the art and as disclosed herein, but the chimeric target/antigen-binding domains(s) render the receptor sensitive to signaling activation when the chimeric target/antigen binding domain binds the target/antigen on the surface of a targeted cell.

With respect to intracellular signaling domains, so-called "first-generation" CARs include those that solely provide CD3zeta (CD3ζ) signals upon antigen binding. So-called "second-generation" CARs include those that provide both co-stimulation (e.g., CD28 or CD137) and activation (CD3ζ) domains, and so-called "third-generation" CARs include those that provide multiple costimulatory (e.g., CD28 and CD137) domains and activation domains (e.g., CD3ζ). In various embodiments, the CAR is selected to have high affinity or avidity for the target/antigen—for example, antibody-derived target or antigen binding domains will generally have higher affinity and/or avidity for the target antigen than would a naturally-occurring immune cell receptor. This property, combined with the high specificity one can select for an antibody provides highly specific immune cell targeting.

Extracellular Domain

The CARs described herein include an extracellular domain including a target-binding domain, which binds to a CAR ligand. In various embodiments, the CARs described herein include an antibody reagent or an antigen-binding domain thereof as a target-binding domain.

As used herein, the term "antibody reagent" refers to a polypeptide that includes at least one immunoglobulin variable domain or immunoglobulin variable domain sequence and which specifically binds a given antigen. An antibody reagent can include an antibody or a polypeptide including an antigen-binding domain of an antibody. In some embodiments of any of the aspects, an antibody reagent can include a monoclonal antibody or a polypeptide including an antigen-binding domain of a monoclonal antibody. For example, an antibody can include a heavy (H) chain variable region (abbreviated herein as $V_H$), and a light (L) chain variable region (abbreviated herein as $V_L$). In another example, an antibody includes two heavy (H) chain variable regions and two light (L) chain variable regions. The term "antibody reagent" encompasses antigen-binding fragments of antibodies (e.g., single chain antibodies, Fab and sFab fragments, F(ab')2, Fd fragments, Fv fragments, scFv, CDRs, and domain antibody (dAb) fragments (see, e.g., de Wildt et al., Eur. J. Immunol. 26(3):629-639, 1996; which is incorporated by reference herein in its entirety)) as well as complete antibodies. An antibody can have the structural features of IgA, IgG, IgE, IgD, or IgM (as well as subtypes and combinations thereof). Antibodies can be from any source, including mouse, rabbit, pig, rat, and primate (human and non-human primate) and primatized antibodies. Antibodies also include midibodies, humanized antibodies, chimeric antibodies, and the like. Fully human antibody binding domains can be selected, for example, from phage display libraries using methods known to those of ordinary skill in the art. Furthermore, antibody reagents include single domain antibodies, such as camelid antibodies.

The $V_H$ and $V_L$ regions can be further subdivided into regions of hypervariability, termed "complementarity determining regions" ("CDR"), interspersed with regions that are more conserved, termed "framework regions" ("FR"). The extent of the framework region and CDRs has been precisely defined (see, Kabat, E. A. et al. (1991) Sequences of Proteins of Immunological Interest, Fifth Edition, U.S. Department of Health and Human Services, NIH Publication No. 91-3242, and Chothia et al., J. Mol. Biol. 196:901-917, 1987; each of which is incorporated by reference herein in its entirety). Each $V_H$ and $V_L$ is typically composed of three CDRs and four FRs, arranged from amino-terminus to carboxy-terminus in the following order: FR1, CDR1, FR2, CDR2, FR3, CDR3, FR4.

In one embodiment, the antibody or antibody reagent is not a human antibody or antibody reagent (i.e., the antibody or antibody reagent is mouse), but has been humanized. A "humanized antibody or antibody reagent" refers to a non-human antibody or antibody reagent that has been modified at the protein sequence level to increase its similarity to antibody or antibody reagent variants produced naturally in humans. One approach to humanizing antibodies employs the grafting of murine or other non-human CDRs onto human antibody frameworks.

In one embodiment, the extracellular target binding domain of a CAR includes or consists essentially of a single-chain Fv (scFv) fragment created by fusing the $V_H$ and $V_L$ domains of an antibody, generally a monoclonal antibody, via a flexible linker peptide. In various embodiments, the scFv is fused to a transmembrane domain and to a T cell receptor intracellular signaling domain, e.g., an engineered intracellular signaling domain as described herein. In another embodiment, the extracellular target binding domain of a CAR includes a camelid antibody.

In particular embodiments, a CAR as described herein includes an anti-FITC scFv as the extracellular target-binding domain.

In another example, the CARs useful in the technology described herein include at least two antigen-specific targeting regions, an extracellular domain, a transmembrane domain, and an intracellular signaling domain. In such embodiments, the two or more antigen-specific targeting regions target at least two different antigens and may be arranged in tandem and separated by linker sequences. In another embodiment, the CAR is a bispecific CAR. A bispecific CAR is specific to two different antigens.

Hinge and Transmembrane Domains

Each CAR as described herein includes a transmembrane domain, optionally including a hinge, which joins the extracellular target-binding domain to the intracellular signaling domain.

The binding domain of, e.g., a CAR, is optionally followed by one or more "hinge domains," which plays a role in positioning the antigen binding domain away from the effector cell surface to enable proper cell/cell contact, antigen binding and activation. A CAR optionally includes one or more hinge domains between the binding domain and the transmembrane domain. The hinge domain may be derived either from a natural, synthetic, semi-synthetic, or recombinant source. The hinge domain can include the amino acid sequence of a naturally occurring immunoglobulin hinge region or an altered immunoglobulin hinge region. Illustrative hinge domains suitable for use in the CARs described herein include the hinge region derived from the extracellular regions of type 1 membrane proteins such as CD8 (e.g., CD8α), CD4, CD28, 4-1 BB, and CD7, which may be wild-type hinge regions from these molecules or may be altered. For example, the hinge region is derived from the hinge region of an immunoglobulin-like protein (e.g., IgA, IgD, IgE, IgG, or IgM), CD28, or CD8.

As used herein, "transmembrane domain" refers to the portion of, e.g., a CAR, that fuses the extracellular binding portion, optionally via a hinge domain, to the intracellular portion (e.g., the co-stimulatory domain and intracellular signaling domain) and anchors the CAR to the plasma membrane of the immune effector cell. The transmembrane domain is a generally hydrophobic region of the CAR which crosses the plasma membrane of a cell. The transmembrane domain can be the transmembrane region or fragment thereof of a transmembrane protein (for example a Type I transmembrane protein or other transmembrane protein), an artificial hydrophobic sequence, or a combination thereof. While specific examples are provided herein and used in the Examples, other transmembrane domains will be apparent to those of skill in the art and can be used in connection with alternate embodiments of the technology. A selected transmembrane region or fragment thereof would preferably not interfere with the intended function of the CAR. As used in relation to a transmembrane domain of a protein or polypeptide, "fragment thereof" refers to a portion of a transmembrane domain that is sufficient to anchor or attach a protein to a cell surface.

In some examples, the transmembrane domain or fragment thereof of the CAR described herein includes a transmembrane domain selected from the transmembrane domain of an alpha, beta or zeta chain of a T-cell receptor, CD28, CD3 epsilon, CD45, CD4, CD5, CD8, CD9, CD16, CD22, CD33, CD37, CD64, CD80, CD86, CD134, CD137, CD154, KIRDS2, OX40, CD2, CD27, LFA-1 (CD11a, CD18), ICOS (CD278), 4-1BB (CD137), 4-1BBL, GITR, CD40, BAFFR, HVEM (LIGHTR), SLAMF7, NKp80 (KLRFI), CD160, CD19, IL2R beta, IL2R gamma, IL7R a, ITGA1, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, DNAM1 (CD226), SLAMF4 (CD244, 2B4), CD84, CD96 (Tactile), CEACAM1, CRT AM, Ly9 (CD229), CD160 (BY55), PSGL1, CD100 (SEMA4D), SLAMF6 (NTB-A, Lyl08), SLAM (SLAMF1, CD150, IPO-3), BLAME (SLAMF8), SELPLG (CD162), LTBR, PAG/Cbp, NKp44, NKp30, NKp46, NKG2D, and/or NKG2C.

As used herein, a "hinge/transmembrane domain" refers to a domain including both a hinge domain and a transmembrane domain. For example, a hinge/transmembrane domain can be derived from the hinge/transmembrane domain of CD8, CD28, CD7, or 4-1 BB.

Co-Stimulatory Domains

Each CAR described herein optionally includes the intracellular domain of one or more co-stimulatory molecule or co-stimulatory domain. As used herein, the term "co-stimulatory domain" refers to an intracellular signaling domain of a co-stimulatory molecule. Co-stimulatory molecules are cell surface molecules other than antigen receptors or Fc receptors that provide a second signal required for efficient activation and function of T lymphocytes upon binding to antigen. The co-stimulatory domain can be, for example, the co-stimulatory domain of 4-1 BB, CD27, CD28, or OX40. Additional illustrative examples of such co-stimulatory molecules include CARD11, CD2, CD7, CD27, CD28, CD30, CD40, CD54 (ICAM), CD83, CD134 (OX40), CD137 (4-1BB), CD150 (SLAMF1), CD152 (CTLA4), CD223 (LAGS), CD270 (HVEM), CD273 (PD-L2), CD274 (PD-L1), CD278 (ICOS), DAP10, LAT, NKD2C SLP76, TRIM, and ZAP70. In one embodiment, the intracellular domain is the intracellular domain of 4-1 BB. 4-1 BB (CD137; TNFRS9) is an activation-induced costimulatory molecule, and is an important regulator of immune responses.

Intracellular Signaling Domains

CARs as described herein include an intracellular signaling domain. An "intracellular signaling domain," refers to the part of a CAR polypeptide that participates in transducing the message of effective CAR binding to a target antigen into the interior of the immune effector cell (e.g., a B cell, a natural killer (NK) cell, a macrophage, a neutrophil, a dendritic cell, a mast cell, an eosinophil, or a basophil, or a T cell) to elicit effector cell function, e.g., activation, cytokine production, proliferation and cytotoxic activity, including the release of cytotoxic factors to the CAR-bound target cell, or other cellular responses elicited following antigen binding to the extracellular CAR domain, such as phagocytosis. The intracellular signaling domain can be derived from, for example, ILR chain, CD28, CD79, CD21, CD19, CD81, NKp46, NKp44, NKp30, NKG2D, CD16, scavenger receptor (SR)-A, CD36, complement receptor (CR) 3, dectin-1, TLR2, TLR4, TLR7, FcγRI, FcγRIIA, FcγRIIIA, FcγRIIIB, FcεRI, DAP12, and FcαRI.

In various examples, the intracellular signaling domain is from CD3ζ (see, e.g., below). Additional non-limiting examples of immunoreceptor tyrosine-based activation motif (ITAM)-containing intracellular signaling domains that are of particular use in the technology include those derived from TCRζ, FcRγ, FcRβ, CD3γ, CD3θ, CD3δ, CD3η, CD3ε, CD3ζ, CD22, CD79a, CD79b, and CD66d.

CD3 is a T cell co-receptor that facilitates T lymphocyte activation when simultaneously engaged with the appropriate co-stimulation (e.g., binding of a co-stimulatory molecule). A CD3 complex consists of 4 distinct chains; mammalian CD3 consists of a CD3γ chain, a CD3δ chain, and two CD3ε chains. These chains associate with a molecule known as the T cell receptor (TCR) and the CD3ζ to generate an activation signal in T lymphocytes. A complete TCR complex includes a TCR, CD3ζ, and the complete CD3 complex.

Exemplary combinations of intracellular signaling domains and immune cells are as follows:

TABLE 1

| Cell Type | Intracellular Signaling Domain |
| --- | --- |
| T cell | TCRζ, CD3γ, CD3θ, CD3δ, CD3η, CD3ε, CD3ζ, CD28, CD81, NKG2D, TLR2 |
| B cell | CD79 (e.g., CD79a or CD79b), CD21, CD19, CD22, CD21, CD19, CD81, TLR2 |
| NK cell | NKp46, NKp44, NKp30, NKG2D, CD16, CR3, FcγRIIIA, DAP12, FcRγ |
| Macrophage | CD16, SR-A, CD36, CR3, dectin-1, TLR2, TLR4, FcγRI, FcγRIIA, FcγRIIIA, FcαRII |
| Neutrophil | CD66d, CD16, CR3, dectin-1, FcγRIIA, FcγRIIIB, |
| Dendritic cell | TLR2, TLR4, TLR7, DAP12, FcRγ, dectin-1 |
| Mast cell | TLR2, TLR4, FcγRIIA, FcεRI, FcRγ, FcRβ |
| Eosinophil | TLR2, TLR4, TLR7, FcαRI, FcRγ, dectin-1 |
| Basophil | FcγRIIIA, FcεRI, FcRγ, FcRβ |

In some embodiments of any aspect, a CAR polypeptide described herein includes an intracellular signaling domain that includes an Immunoreceptor Tyrosine-based Activation Motif or ITAM from CD3 zeta (CD3ζ), including variants of CD3ζ such as ITAM-mutated CD3ζ, CD3η, or CD3θ. In some embodiments of any aspect, the ITAM includes three motifs of ITAM of CD3ζ (ITAM3). In some embodiments of any aspect, the three motifs of ITAM of CD3ζ are not mutated and, therefore, include native or wild-type sequences.

Individual CAR and other construct components as described herein can be used with one another and swapped in and out of various constructs described herein, as can be determined by those of skill in the art. Each of these components can include or consist of any of the corresponding sequences set forth herein, or variants thereof.

In some embodiments, a CAR polypeptide as described herein includes a signal peptide. Signal peptides can be derived from any protein that has an extracellular domain or is secreted. A CAR polypeptide as described herein may include any signal peptides known in the art.

In one embodiment, the CAR further includes a linker domain. As used herein, "linker domain" refers to an oligo- or polypeptide region from about 2 to 100 amino acids in length, which links together any of the domains/regions of the CAR as described herein. In some embodiment, linkers can include or be composed of flexible residues such as glycine and serine so that the adjacent protein domains are free to move relative to one another. Linker sequences useful for the invention can be from 2 to 100 amino acids, 5 to 50 amino acids, 10 to 15 amino acids, 15 to 20 amino acids, or 18 to 20 amino acids in length, and include any suitable linkers known in the art. Longer linkers may be used when it is desirable to ensure that two adjacent domains do not sterically interfere with one another. Furthermore, linkers may be cleavable or non-cleavable. Examples of cleavable linkers include 2A linkers (e.g., P2A and T2A), 2A-like linkers or functional equivalents thereof and combinations thereof. It is to be understood that the indication of a particular linker in a construct in a particular location does not mean that only that linker can be used there. Rather, different linker sequences (e.g., P2A and T2A) can be swapped with one another (e.g., in the context of the constructs of the present invention), as can be determined by those of skill in the art. In one embodiment, the linker region is T2A derived from Thosea asigna virus. Non-limiting examples of linkers that can be used in this technology include T2A, P2A, E2A, BmCPV2A, and BmIFV2A. Linkers such as these can be used in the context of polyproteins, such as those described below.

In some embodiments, a CAR as described herein optionally further includes a reporter molecule, e.g., to permit for non-invasive imaging (e.g., positron-emission tomography PET scan). In a bispecific CAR that includes a reporter molecule, the first extracellular binding domain and the second extracellular binding domain can include different or the same reporter molecule. In a bispecific CAR T cell, the first CAR and the second CAR can express different or the same reporter molecule. In another embodiment, a CAR as described herein further includes a reporter molecule (for example hygromycin phosphotransferase (hph)) that can be imaged alone or in combination with a substrate or chemical (for example 9-[4-[$^{18}$F]fluoro-3-(hydroxymethyl)butyl]guanine ([$^{18}$F]FHBG)). In another embodiment, a CAR as described herein further includes nanoparticles at can be readily imaged using non-invasive techniques (e.g., gold nanoparticles (GNP) functionalized with $^{64}Cu^{2+}$). Labeling of CAR T cells for non-invasive imaging is reviewed, for example in Bhatnagar et al., Integr. Biol. (Camb). 5(1):231-238, 2013, and Keu et al., Sci. Transl. Med. 18; 9(373), 2017, which are incorporated herein by reference in their entireties.

GFP and mCherry are demonstrated herein as fluorescent tags useful for imaging a CAR expressed on a T cell (e.g., a CAR T cell). It is expected that essentially any fluorescent protein known in the art can be used as a fluorescent tag for this purpose. For clinical applications, the CAR need not include a fluorescent tag or fluorescent protein. In each instance of particular constructs provided herein, therefore, any markers present in the constructs can be removed. The invention includes the constructs with or without the markers. Accordingly, when a specific construct is referenced herein, it can be considered with or without any markers or tags as being included within the invention.

Chimeric Cytokine Receptors

A chimeric cytokine receptor is a molecule which includes a cytokine receptor intracellular domain, a transmembrane domain, and an extracellular domain including a target-binding domain; optionally, the chimeric cytokine receptor also includes a signal peptide as described herein. The extracellular domain binds a ligand other than the cytokine for which the cytokine receptor from which the intracellular domain was derived is selective. In this way, it is possible to alter the ligand specificity of a cytokine receptor by grafting on a heterologous binding specificity.

Accordingly, a chimeric cytokine receptor includes a ligand binding extracellular domain; a transmembrane domain (optionally including a hinge); and a cytokine-receptor intracellular domain.

Cytokine Receptors and Signaling

Many cell functions are regulated by members of the cytokine receptor superfamily. Signaling by these receptors depends upon their association with Janus kinases (JAKs), which couple ligand binding to tyrosine phosphorylation of signaling proteins recruited to the receptor complex. Among these are the signal transducers and activators of transcription (STATs), a family of transcription factors that contribute to the diversity of cytokine responses.

When the chimeric cytokine receptor of the invention binds its ligand, one or more of the following intracellular signaling pathways may be initiated: (i) the JAK-STAT pathway; (ii) the MAP kinase pathway; and (iii) the phosphoinositide 3-kinase (PI3K) pathway.

The JAK-STAT system consists of three main components: (1) a receptor, (2) Janus kinase (JAK), and (3) Signal Transducer and Activator of Transcription (STAT). JAKs, which have tyrosine kinase activity, bind to cell surface cytokine receptors. The binding of the ligand to the receptor triggers activation of JAKs. With increased kinase activity, JAKs phosphorylate tyrosine residues on the receptor and create sites for interaction with proteins that contain phosphotyrosine-binding SH2 domains. STATs possessing SH2 domains capable of binding these phosphotyrosine residues are recruited to the receptors, and are themselves tyrosine-phosphorylated by JAKs. These phosphotyrosines then act as binding sites for SH2 domains of other STATs, mediating their dimerization. Different STATs form hetero- or homodimers. Activated STAT dimers accumulate in the cell nucleus and activate transcription of their target genes.

Extracellular Domain

The extracellular domain of a chimeric cytokine receptor described herein includes a target-binding domain. In some embodiments, the target-binding domain of the extracellular domain of a chimeric cytokine receptor includes an antibody reagent, e.g., an antigen-binding fragment of an antibody, as described above. In one example, the antibody reagent is an scFv. In particular embodiments, the target-binding domain includes an anti-FITC scFv.

In further embodiments, the target-binding domain of the extracellular domain includes FK506 binding protein (FKBP) (GenBank No.: AAD40379.1), FKBP rapamycin binding domain (FRB) (InterPro Database No.: IPR009076), or avidin (UniProt No.: P02701), or a portion thereof.

Hinge/Transmembrane Domain

As described above, a transmembrane domain fuses the extracellular binding portion of the chimeric cytokine receptor to the intracellular portion of the receptor. The transmembrane domain can optionally include a hinge.

Exemplary hinge domains include, but are not limited to, those derived from an immunoglobulin-like protein (e.g., IgA, IgD, IgE, IgG, or IgM) or the extracellular regions of type 1 membrane proteins such as CD8 (e.g., CD8a), CD4, CD28, 4-1 BB, and CD7. Exemplary transmembrane domains useful for the chimeric cytokine receptors described herein include, but are not limited to, the transmembrane domain of an alpha, beta or zeta chain of a T-cell receptor, CD28, CD3 epsilon, CD45, CD4, CD5, CD8, CD9, CD16, CD22, CD33, CD37, CD64, CD80, CD86, CD134, CD137, CD154, KIRDS2, OX40, CD2, CD27, LFA-1 (CD11a, CD18), ICOS (CD278), 4-1BB (CD137), 4-1 BBL, GITR, CD40, BAFFR, HVEM (LIGHTR), SLAMF7, NKp80 (KLRF1), CD160, CD19, IL2R beta, IL2R gamma, IL7R a, ITGA1, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11 b, ITGAX, CD11c, ITGB1, CD29, ITGB2, CD18, LFA-1, ITGB7, TNFR2, DNAM1(CD226), SLAMF4 (CD244, 2B4), CD84, CD96 (Tactile), CEACAM1, CRT AM, Ly9 (CD229), CD160 (BY55), PSGL1, CD100 (SEMA4D), SLAMF6 (NTB-A, Ly108), SLAM (SLAMF1, CD150, IPO-3), BLAME (SLAMF8), SELPLG (CD162), LTBR, PAG/Cbp, NKp44, NKp30, NKp46, NKG2D, and/or NKG2C.

Intracellular Cytokine Receptor Domain

The chimeric cytokine receptor of the present invention includes an intracellular domain which causes "cytokine-type" cell signaling (either alone or when in the presence of another chimeric cytokine receptor) when the extracellular domain binds its ligand. The intracellular domain may be an intracellular cytokine receptor domain, described below.

In some embodiments, the intracellular cytokine receptor domain may be derived from a type II cytokine receptor. Type II cytokine receptors include those that bind type I and type II interferons, and those that bind members of the IL-10 family (IL-10, IL-20 and IL-22). The term "derived from" means that the intracellular domain of the chimeric cytokine receptor of the invention has the same sequence as the wild-type sequence of the endogenous molecule, or a variant thereof which retains the ability to form a complex with JAK-1 or JAK-3 and activate one of the signaling pathways mentioned above. Furthermore, a "variant" sequence refers to a sequence having at least 80%, 85%, 90%, 91%, 92%, 93%, 94%, 95%, 96%, 97%, 98%, or 99% sequence identity to a wild-type sequence, providing that the variant sequence retains the function of the wild-type sequence, i.e., the ability to form a complex with JAK-1 or JAK-3 and activate, for example, the JAK-STAT signaling pathway.

In other embodiments, the intracellular cytokine receptor domain may be derived from a type I cytokine receptor. Type I cytokine receptors include: interleukin receptors, such as the receptors for IL-2, IL-3, IL-4, IL-5, IL-6, IL-7, IL-9, IL-11, IL-12, IL13, IL-15, IL-18, IL-21, IL-23 and IL-27; colony stimulating factor receptors, such as the receptors for erythropoietin, granulocyte-macrophage colony-stimulating factor (GM-CSF), and granulocyte-colony stimulating factor (G-CSF); and hormone receptor or neuropeptide receptor, such as hormone receptor and prolactin receptor.

Members of the type I cytokine receptor family have different chains, some of which are involved in ligand/cytokine interaction and others that are involved in signal transduction. For example the IL-2 receptor has an α-chain, a β-chain and a γ-chain. The IL-2 receptor common gamma chain (also known as CD132) is shared between the IL-2 receptor, IL-4 receptor, IL-7 receptor, IL-9 receptor, IL-13 receptor and IL-15 receptor.

IL-2 binds to the IL-2 receptor (IL-2R), which has three forms, generated by different combinations of three different proteins, often referred to as "chains": α, β and γ; these subunits are also parts of receptors for other cytokines. The β and γ chains of the IL-2R are members of the type I cytokine receptor family. The three receptor chains are expressed separately and differently on various cell types and can assemble in different combinations and orders to generate low, intermediate, and high affinity IL-2 receptors. The α chain binds IL-2 with low affinity, the combination of β and γ together form a complex that binds IL-2 with intermediate affinity, primarily on memory T cells and NK cells; and all three receptor chains form a complex that binds IL-2 with high affinity (Kd~10-11 M) on activated T cells and regulatory T cells. The three IL-2 receptor chains span the cell membrane and extend into the cell, thereby delivering biochemical signals to the cell interior. The alpha chain does not participate in signaling, but the beta chain is complexed with the tyrosine phosphatase JAK1. Similarly the gamma chain complexes with another tyrosine kinase called JAK3. These enzymes are activated by IL-2 binding to the external domains of the IL-2R. IL-2 signaling promotes the differentiation of T cells into effector T cells and into memory T cells when the initial T cells are also stimulated by an antigen. Through their role in the development of T cell immunologic memory, which depends upon the expansion of the number and function of antigen-selected T cell clones, they also have a key role in long-term cell-mediated immunity.

The chimeric cytokine receptor of the present invention may include the IL-2 receptor β-chain and/or the IL-2 receptor (i.e., common) γ-chain. The common-γ chain receptors is shared with various cytokines, including IL-7, IL-4, IL-9, and IL-15.

The IL-7 receptor (IL-7R) is made up of two chains: the IL-7R-α chain (CD127) and common-γ chain receptor (CD132). IL-7R is expressed on various cell types, including naive and memory T cells. IL-7R plays a critical role in the development of lymphocytes, especially in V(D)J recombination. IL-7R also controls the accessibility of a region of the genome that contains the T-cell receptor gamma gene, by STAT5 and histone acetylation. Knockout studies in mice suggest that blocking apoptosis is an essential function of this protein during differentiation and activation of T lymphocytes. A chimeric cytokine receptor described herein may include the IL-7 receptor α-chain and/or the IL-7 receptor (i.e., common) γ-chain, or a variant thereof.

IL-15 is a cytokine with structural similarity to IL-2. Like IL-2, IL-15 binds to and signals through a complex composed of IL-2/IL-15 receptor beta chain (CD122) and the common gamma chain (gamma-C, CD132). IL-15 is secreted by mononuclear phagocytes (and some other cells) following viral infection. IL-15 induces cell proliferation of natural killer cells. IL-15 receptor (IL-15R) consists of an IL-15R α subunit and shares common β and γ subunits with the IL-2 receptor.

Chimeric Co-Stimulation Receptors

A chimeric co-stimulation receptor described herein includes an extracellular including a target-binding domain, a transmembrane domain (optionally including a hinge), a co-stimulatory domain, and an intracellular signaling domain. Optionally, the chimeric co-stimulation receptor includes a signal peptide as described herein.

Extracellular Domain

The extracellular domain of a chimeric co-stimulation receptor described herein includes a target-binding domain. In some embodiments, the target-binding domain of the extracellular domain of a chimeric cytokine receptor includes an antibody reagent, e.g., an antigen-binding fragment of an antibody as described herein. In one example, the antibody reagent is an scFv. In particular embodiments, the target-binding domain includes an anti-FITC scFv.

In further embodiments, the target-binding domain of the extracellular domain includes FKBP (GenBank No.: AAD40379.1), FRB (InterPro Database No.: IPR009076), or FKBP12 (UniProt No.: P62942), or a portion thereof. In certain embodiments, the chimeric co-stimulation receptor includes two target-binding domains. In some embodiments, each target binding domain includes FKBP, or a portion there of. In other embodiments, each target binding domain includes FRB, or a portion thereof. In further embodiments, each target binding domain includes FKBP12, or a portion thereof. In further embodiments, one of the two target binding domains includes FKBP, FRB, or FKBP12, or a portion thereof.

Hinge/Transmembrane Domain

As described above, a transmembrane domain fuses the extracellular binding portion of the chimeric cytokine receptor to the intracellular portion of the receptor. The transmembrane domain can optionally include a hinge.

Exemplary hinge domains include, but are not limited to, those derived from an immunoglobulin-like protein (e.g., IgA, IgD, IgE, IgG, or IgM) or the extracellular regions of type 1 membrane proteins such as CD8 (e.g., CD8α), CD4, CD28, 4-1 BB, and CD7. Exemplary transmembrane domains useful for the chimeric cytokine receptors described herein include, but are not limited to, the transmembrane domain of an alpha, beta or zeta chain of a T-cell receptor, CD28, CD3 epsilon, CD45, CD4, CD5, CD8, CD9, CD16, CD22, CD33, CD37, CD64, CD80, CD86, CD134, CD137, CD154, KIRDS2, OX40, CD2, CD27, LFA-1 (CD11a, CD18), ICOS (CD278), 4-1 BB (CD137), 4-1 BBL, GITR, CD40, BAFFR, HVEM (LIGHTR), SLAMF7, NKp80 (KLRF1), CD160, CD19, IL2R beta, IL2R gamma, IL7R a, ITGA1, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11 b, ITGAX, CD11c, ITGB1, CD29, ITGB2, CD18, LFA-1, ITGB7, TNFR2, DNAM1(CD226), SLAMF4 (CD244, 2B4), CD84, CD96 (Tactile), CEACAM1, CRT AM, Ly9 (CD229), CD160 (BY55), PSGL1, CD100 (SEMA4D), SLAMF6 (NTB-A, Lyl08), SLAM (SLAMF1, CD150, IPO-3), BLAME (SLAMF8), SELPLG (CD162), LTBR, PAG/Cbp, NKp44, NKp30, NKp46, NKG2D, and/or NKG2C.

Co-Stimulatory Domain

The chimeric co-stimulation receptors described herein include a co-stimulatory domain, which is derived from a co-stimulatory molecule. Exemplary co-stimulatory molecules useful for the invention include CARD11, CD2, CD7, CD27, CD28, CD30, CD40, CD54 (ICAM), CD83, CD134 (OX40), CD137 (4-1BB), CD150 (SLAMF1), CD152 (CTLA4), CD223 (LAGS), CD270 (HVEM), CD273 (PD-L2), CD274 (PD-L1), CD278 (ICOS), DAP10, LAT, NKD2C SLP76, TRIM, and ZAP70. In some embodiments, the co-stimulatory domain includes a 4-1 BB, CD27, CD28, OX40, ICOS, GITR, or CD40 co-stimulatory domain.

In one embodiment, the chimeric co-stimulation receptor includes an inducible MyD88/CD40 co-stimulatory domain, which includes a portion of or full-length MyD88 fused with a portion or full-length CD40. In particular embodiments, the MyD88/CD40 co-stimulatory domain is activated by binding of the chimeric co-stimulation receptor to the dimerizing agent AP20187.

Intracellular Signaling Domain

The chimeric co-stimulation receptor can also include an intracellular signaling domains. Intracellular signaling domains useful for the chimeric co-stimulation receptors described herein include TCRζ, FcRγ, FcRβ, CD3γ, CD3θ, CD3δ, CD3η, CD3ε, CD3ζ, CD22, CD79a, CD79b, and CD66d. In some embodiments, the intracellular signaling domain includes a CD3 intracellular signaling domain. Further examples of intracellular signaling domains useful for the chimeric co-stimulation receptors described herein include ILR chain, CD28, CD79, CD21, CD19, CD81, NKp46, NKp44, NKp30, NKG2D, CD16, scavenger receptor (SR)-A, CD36, complement receptor (CR) 3, dectin-1, TLR2, TLR4, TLR7, FcγRI, FcγRIIA, FcγRIIIA, FcγRIIIB, FcεRI, DAP12, and FcαRI.

Synthetic Notch (synNotch) Receptors

A synNotch receptor polypeptide as described herein includes an extracellular domain including a target-binding domain; a Notch regulatory region, where the Notch regulatory region has a length of from 50 amino acids to 1000 amino acids, and includes one or more ligand-inducible proteolytic cleavage sites; and an intracellular transcriptional domain. SynNotch receptors are described in further detail in U.S. Pat. No. 9,670,281, the contents of which are incorporated herein by reference in their entirety.

Binding of the synNotch receptor target to the target-binding domain induces cleavage of the Notch regulatory region at the one or more ligand-inducible proteolytic cleavage sites, thereby releasing the intracellular domain. Release of the intracellular domain modulates an activity of a cell that produces the synNotch receptor polypeptide. The extracellular domain includes a target-binding domain; the target-binding domain includes an amino acid sequence that is heterologous to the Notch regulatory region. The intracellular transcriptional domain includes an amino acid sequence that is heterologous to the Notch regulatory region.

Extracellular Domain

The extracellular domain of a synNotch receptor described herein includes a target-binding domain. In some embodiments, the target-binding domain of the extracellular domain of a synNotch receptor includes an antibody reagent, e.g., an antigen-binding fragment of an antibody. In one example, the antibody reagent is a scFv. In particular embodiments, the target-binding domain includes an anti-FITC scFv.

Notch Regulatory Region

A Notch regulatory region includes three proteolytic sites, termed 51, S2, and S3. S1, a furin cleavage site, is located between HD-N and HC-C; S2, an ADAM17 cleavage site, is located within HD-C; and S3, a gamma secretase cleavage site, is within the TM portion. A Notch regulatory region mediates cell-to-cell communication, e.g., communication between contacting cells, in which one contacting cell is a "receiver" cell and the other contacting cell is a "sender" cell. Engagement of a Notch regulatory region present on a receiving cell by a Delta polypeptide ("ligand") present on a sending cell results in ligand-induced cleavage of the Notch regulatory region, resulting in release of the intracellular portion of the receptor from the membrane into the cytoplasm. The released portion alters receiver cell behavior by functioning as a transcriptional regulator.

Intracellular Transcriptional Domain

As noted above, a synNotch receptor polypeptide of the present disclosure includes an intracellular transcriptional domain that is released following binding of the synNotch receptor polypeptide to the second member of the specific binding pair, where binding of the synNotch receptor polypeptide to the second member of the specific binding pair induces cleavage of an above-mentioned proteolytic cleavage site. The intracellular transcriptional domain includes an amino acid sequence that is heterologous to the Notch receptor polypeptide. In other words, the intracellular transcriptional domain includes an amino acid sequence that is not naturally present in a Notch receptor polypeptide.

The intracellular transcriptional domain, when released from the synNotch receptor polypeptide, provides an effector function, where effector functions include, e.g., increased production of one or more cytokines by the cell; reduced production of one or more cytokines by the cell; increased or decreased production of a hormone by the cell; production of an antibody by the cell; a change in organelle activity; a change in trafficking of a polypeptide within the cell; a change in transcription of a target gene; a change in activity of a protein; a change in cell behavior, e.g., cell death; cellular proliferation; effects on cellular differentiation; effects on cell survival; modulation of cellular signaling responses; etc. In some cases, the intracellular transcriptional domain, when released from the synNotch receptor polypeptide, provides for a change in transcription of a target gene. In some cases, the intracellular transcriptional domain, when released from the synNotch receptor polypeptide, provides for an increase in the transcription of a target gene. In some cases, the intracellular transcriptional domain, when released from the synNotch receptor polypeptide, provides for a decrease in target gene expression.

The intracellular transcriptional domain can be any of a wide variety of polypeptides, where examples include, but are not limited to, transcriptional activators; transcriptional repressors; transcriptional co-activators; transcriptional co-repressors; DNA binding polypeptides; RNA binding polypeptides; translational regulatory polypeptides; hormones; cytokines; toxins; antibodies; chromatin modulators; suicide proteins; organelle specific polypeptides (e.g., a nuclear pore regulator, a mitochondrial regulator, an endoplasmic reticulum regulator, and the like); pro-apoptosis polypeptides; anti-apoptosis polypeptides; other polypeptides that promote cell death through other mechanisms; pro-proliferation polypeptides; anti-proliferative polypeptides; immune co-stimulatory polypeptides; site-specific nucleases; recombinases; inhibitory immunoreceptors; an activating immunoreceptor; Cas9 and variants of RNA targeted nucleases; and DNA recognition polypeptides; dominant negative variants of a polypeptide; a signaling polypeptide; a receptor tyrosine kinase; a non-receptor tyrosine kinase; a polypeptide that promotes differentiation; and the like.

In some embodiments, the release of the intracellular transcriptional domain results in increased production of cytokines of the cell, such as IL-2, IL-15, IL-7, IL-21, IL-12, IFN-$\alpha$, or IFN-$\beta$.

Methods of Making Polypeptides

In some embodiments, the polypeptides described herein for use in the amphiphilic conjugates (e.g., tumor associated antigens) are made in transformed host cells using recombinant DNA techniques. To do so, a recombinant DNA molecule coding for the peptide is prepared. Methods of preparing such DNA molecules are well known in the art. For instance, sequences coding for the peptides could be excised from DNA using suitable restriction enzymes. Alternatively, the DNA molecule could be synthesized using chemical synthesis techniques, such as the phosphoramidate method. Also, a combination of these techniques could be used.

The methods of making polypeptides also include a vector capable of expressing the peptides in an appropriate host. The vector includes the DNA molecule that codes for the peptides operatively linked to appropriate expression control sequences. Methods of affecting this operative linking, either before or after the DNA molecule is inserted into the vector, are well known. Expression control sequences include promoters, activators, enhancers, operators, ribosomal nuclease domains, start signals, stop signals, cap signals, polyadenylation signals, and other signals involved with the control of transcription or translation.

The resulting vector having the DNA molecule thereon is used to transform an appropriate host. This transformation may be performed using methods well known in the art.

Any of a large number of available and well-known host cells may be suitable for use in the methods disclosed herein. The selection of a particular host is dependent upon a number of factors recognized by the art. These include, for example, compatibility with the chosen expression vector, toxicity of the peptides encoded by the DNA molecule, rate of transformation, ease of recovery of the peptides, expression characteristics, bio-safety and costs. A balance of these factors must be struck with the understanding that not all hosts may be equally effective for the expression of a particular DNA sequence. Within these general guidelines, useful microbial hosts include bacteria (such as *E. coli* sp.), yeast (such as *Saccharomyces* sp.) and other fungi, insects, plants, mammalian (including human) cells in culture, or other hosts known in the art.

Next, the transformed host is cultured and purified. Host cells may be cultured under conventional fermentation conditions so that the desired compounds are expressed. Such fermentation conditions are well known in the art. Finally, the peptides are purified from culture by methods well known in the art.

The compounds may also be made by synthetic methods. For example, solid phase synthesis techniques may be used. Suitable techniques are well known in the art, and include those described in Merrifield (1973), Chem. Polypeptides, pp. 335-61 (Katsoyannis and Panayotis eds.); Merrifield (1963), J. Am. Chem. Soc. 85: 2149; Davis et al. (1985), Biochem. Intl. 10: 394-414; Stewart and Young (1969), Solid Phase Peptide Synthesis; U.S. Pat. No. 3,941,763; Finn et al. (1976), The Proteins (3rd ed.) 2: 105-253; and Erickson et al. (1976), The Proteins (3rd ed.) 2: 257-527. Solid phase synthesis is the preferred technique of making individual peptides since it is the most cost-effective method of making small peptides. Compounds that contain derivatized peptides or which contain non-peptide groups may be synthesized by well-known organic chemistry techniques.

Other methods are of molecule expression/synthesis are generally known in the art to one of ordinary skill.

The nucleic acid molecules described above can be contained within a vector that is capable of directing their expression in, for example, a cell that has been transduced with the vector. Accordingly, in addition to polypeptide mutants, expression vectors containing a nucleic acid molecule encoding a mutant and cells transfected with these vectors are among the certain embodiments.

Vectors suitable for use include T7-based vectors for use in bacteria (see, for example, Rosenberg et al., Gene 56: 125, 1987), the pMSXND expression vector for use in mammalian cells (Lee and Nathans, J. Biol. Chem. 263:3521, 1988), and baculovirus-derived vectors (for example the expression vector pBacPAKS from Clontech, Palo Alto, Calif.) for use in insect cells. The nucleic acid inserts, which encode the polypeptide of interest in such vectors, can be operably linked to a promoter, which is selected based on, for example, the cell type in which expression is sought. For example, a T7 promoter can be used in bacteria, a polyhedrin promoter can be used in insect cells, and a cytomegalovirus or metallothionein promoter can be used in mammalian cells. Also, in the case of higher eukaryotes, tissue-specific and cell type-specific promoters are widely available. These promoters are so named for their ability to direct expression of a nucleic acid molecule in a given tissue or cell type within the body. Skilled artisans are well aware of numerous promoters and other regulatory elements which can be used to direct expression of nucleic acids.

In addition to sequences that facilitate transcription of the inserted nucleic acid molecule, vectors can contain origins of replication, and other genes that encode a selectable marker. For example, the neomycin-resistance (neon) gene imparts G418 resistance to cells in which it is expressed, and thus permits phenotypic selection of the transfected cells. Those of skill in the art can readily determine whether a given regulatory element or selectable marker is suitable for use in a particular experimental context.

Viral vectors that are suitable for use include, for example, retroviral, adenoviral, and adeno-associated vectors, herpes virus, simian virus 40 (SV 40), and bovine papilloma virus vectors (see, for example, Gluzman (Ed.), Eukaryotic Viral Vectors, CSH Laboratory Press, Cold Spring Harbor, N.Y.).

Prokaryotic or eukaryotic cells that contain and express a nucleic acid molecule that encodes a polypeptide mutant are also suitable for use. A cell is a transfected cell, i.e., a cell into which a nucleic acid molecule, for example a nucleic acid molecule encoding a mutant polypeptide, has been introduced by means of recombinant DNA techniques. The progeny of such a cell are also considered suitable for use in the methods disclosed herein.

The precise components of the expression system are not critical. For example, a polypeptide mutant can be produced in a prokaryotic host, such as the bacterium *E. coli*, or in a eukaryotic host, such as an insect cell (e.g., an Sf21 cell), or mammalian cells (e.g., COS cells, NIH 3T3 cells, or HeLa cells). These cells are available from many sources, including the American Type Culture Collection (Manassas, Va.). In selecting an expression system, it matters only that the components are compatible with one another. Artisans of ordinary skill are able to make such a determination. Furthermore, if guidance is required in selecting an expression system, skilled artisans may consult Ausubel et al. (Current Protocols in Molecular Biology, John Wiley and Sons, New York, N.Y., 1993) and Pouwels et al. (Cloning Vectors: A Laboratory Manual, 1985 Suppl. 1987).

The expressed polypeptides can be purified from the expression system using routine biochemical procedures, and can be used, e.g., conjugated to a lipid, as described herein.

Pharmaceutical Composition and Modes of Administration

In some embodiments, an amphiphilic ligand conjugate and an immune cell expressing an engineered receptor (e.g., a CAR, a chimeric cytokine receptor, a chimeric co-stimulation receptor, or a synNotch receptor) are administered together (simultaneously or sequentially). In some embodiments, an amphiphilic ligand conjugate and an adjuvant (e.g., amphiphilic oligonucleotide conjugate) are administered together (simultaneously or sequentially). In some embodiments, an amphiphilic ligand conjugate, an adjuvant (e.g., amphiphilic oligonucleotide conjugate), and an immune cell expressing an engineered receptor (e.g., a CAR, a chimeric cytokine receptor, a chimeric co-stimulation receptor, or a synNotch receptor) are administered together (simultaneously or sequentially). In some embodiments, an amphiphilic ligand conjugate and an immune cell expressing an engineered receptor (e.g., a CAR, a chimeric cytokine receptor, a chimeric co-stimulation receptor, or a synNotch receptor) are administered separately. In some embodiments, an amphiphilic ligand conjugate and an adjuvant (e.g., amphiphilic oligonucleotide conjugate) are administered separately. In some embodiments, an amphiphilic ligand conjugate, an adjuvant (e.g., amphiphilic oligonucleotide conjugate) and an immune cell expressing an engineered receptor (e.g., a CAR, a chimeric cytokine receptor, a chimeric co-stimulation receptor, or a synNotch receptor) are administered separately.

In some embodiments, the disclosure provides for a pharmaceutical composition including an amphiphilic ligand conjugate with a pharmaceutically acceptable diluent, carrier, solubilizer, emulsifier, preservative and/or adjuvant. In some embodiments, the adjuvant is an amphiphilic oligonucleotide conjugate.

In some embodiments, acceptable formulation materials preferably are nontoxic to recipients at the dosages and concentrations employed. In certain embodiments, the formulation material(s) are for subcutaneous (s.c.) and/or intravenous (i.v.) administration. In some embodiments, the pharmaceutical composition can contain formulation materials for modifying, maintaining or preserving, for example, the pH, osmolality, viscosity, clarity, color, isotonicity, odor, sterility, stability, rate of dissolution or release, adsorption or penetration of the composition. In some embodiments, suitable formulation materials include, but are not limited to, amino acids (such as glycine, glutamine, asparagine, arginine or lysine); antimicrobials; antioxidants (such as ascorbic acid, sodium sulfite or sodium hydrogen-sulfite); buffers (such as borate, bicarbonate, Tris-HCl, citrates, phosphates or other organic acids); bulking agents (such as mannitol or glycine); chelating agents (such as ethylenediamine tetraacetic acid (EDTA)); complexing agents (such as caffeine, polyvinylpyrrolidone, beta-cyclodextrin or hydroxypropyl-beta-cyclodextrin); fillers; monosaccharides; disaccharides; and other carbohydrates (such as glucose, mannose or dextrins); proteins (such as serum albumin, gelatin or immunoglobulins); coloring, flavoring and diluting agents; emulsifying agents; hydrophilic polymers (such as polyvinylpyrrolidone); low molecular weight polypeptides; salt-forming counterions (such as sodium); preservatives (such as benzalkonium chloride, benzoic acid, salicylic acid, thimerosal, phenethyl alcohol, methylparaben, propylparaben, chlorhexidine, sorbic acid or hydrogen peroxide); solvents (such as glycerin, propylene glycol or polyethylene glycol); sugar alcohols (such as mannitol or sorbitol); suspending agents; surfactants or wetting agents (such as pluronics, PEG, sorbitan esters, polysorbates such as polysorbate 20, polysorbate 80, triton, tromethamine, lecithin, cholesterol, tyloxapal); stability enhancing agents (such as sucrose or sorbitol); tonicity enhancing agents (such as alkali metal halides, preferably sodium or potassium chloride, mannitol sorbitol); delivery vehicles; diluents; excipients and/or pharmaceutical adjuvants. (Remington's Pharmaceutical Sciences, 18th Edition, A. R. Gennaro, ed., Mack Publishing Company (1995). In certain embodiments, the formulation includes PBS; 20 mM NaOAC, pH 5.2, 50 mM NaCl; and/or 10 mM NAOAC, pH 5.2, 9% Sucrose. In some embodiments, the optimal pharmaceutical composition will be determined by one skilled in the art depending upon, for example, the intended route of administration, delivery format and desired dosage. See, for example, Remington's Pharmaceutical Sciences, supra. In some embodiments, such compositions may influence the physical state, stability, rate of in vivo release and rate of in vivo clearance of the amphiphilic conjugate.

In some embodiments, the primary vehicle or carrier in a pharmaceutical composition can be either aqueous or non-aqueous in nature. For example, in some embodiments, a suitable vehicle or carrier can be water for injection, physiological saline solution or artificial cerebrospinal fluid, possibly supplemented with other materials common in compositions for parenteral administration. In some embodiments, the saline includes isotonic phosphate-buffered saline. In certain embodiments, neutral buffered saline or saline mixed with serum albumin are further exemplary vehicles. In some embodiments, pharmaceutical compositions include Tris buffer of about pH 7.0-8.5, or acetate buffer of about pH 4.0-5.5, which can further include sorbitol or a suitable substitute therefore. In some embodiments, a composition including an amphiphilic conjugate can be prepared for storage by mixing the selected composition having the desired degree of purity with optional formulation agents (Remington's Pharmaceutical Sciences, supra) in the form of a lyophilized cake or an aqueous solution. Further, in some embodiments, a composition including an amphiphilic conjugate, can be formulated as a lyophilizate using appropriate excipients such as sucrose.

In some embodiments, the pharmaceutical composition can be selected for parenteral delivery. In some embodiments, the compositions can be selected for inhalation or for delivery through the digestive tract, such as orally. The preparation of such pharmaceutically acceptable compositions is within the ability of one skilled in the art.

In some embodiments, the formulation components are present in concentrations that are acceptable to the site of administration. In some embodiments, buffers are used to maintain the composition at physiological pH or at a slightly lower pH, typically within a pH range of from about 5 to about 8.

In some embodiments, when parenteral administration is contemplated, a therapeutic composition can be in the form of a pyrogen-free, parenterally acceptable aqueous solution including an amphiphilic conjugate, in a pharmaceutically acceptable vehicle. In some embodiments, a vehicle for parenteral injection is sterile distilled water in which an amphiphilic conjugate is formulated as a sterile, isotonic solution, properly preserved. In some embodiments, the preparation can involve the formulation of the desired molecule with an agent, such as injectable microspheres, bio-erodible particles, polymeric compounds (such as polylactic acid or polyglycolic acid), beads or liposomes, that can provide for the controlled or sustained release of the product which can then be delivered via a depot injection. In some embodiments, hyaluronic acid can also be used, and can have the effect of promoting sustained duration in the circulation. In some embodiments, implantable drug delivery devices can be used to introduce the desired molecule.

In some embodiments, a pharmaceutical composition can be formulated for inhalation. In some embodiments, an amphiphilic conjugate can be formulated as a dry powder for inhalation. In some embodiments, an inhalation solution including an amphiphilic conjugate can be formulated with a propellant for aerosol delivery. In some embodiments, solutions can be nebulized. Pulmonary administration is further described in PCT Publication No. WO/1994/020069, which describes pulmonary delivery of chemically modified proteins.

In some embodiments, it is contemplated that formulations can be administered orally. In some embodiments, an amphiphilic conjugate that is administered in this fashion can be formulated with or without those carriers customarily used in the compounding of solid dosage forms such as tablets and capsules. In some embodiments, a capsule can be designed to release the active portion of the formulation at the point in the gastrointestinal tract when bioavailability is maximized and pre-systemic degradation is minimized. In some embodiments, at least one additional agent can be included to facilitate absorption of the amphiphilic conjugate. In certain embodiments, diluents, flavorings, low melting point waxes, vegetable oils, lubricants, suspending agents, tablet disintegrating agents, and binders can also be employed.

In some embodiments, a pharmaceutical composition can involve an effective quantity of an amphiphilic conjugate in a mixture with non-toxic excipients which are suitable for the manufacture of tablets. In some embodiments, by dissolving the tablets in sterile water, or another appropriate vehicle, solutions can be prepared in unit-dose form. In some embodiments, suitable excipients include, but are not limited to, inert diluents, such as calcium carbonate, sodium carbonate or bicarbonate, lactose, or calcium phosphate; or binding agents, such as starch, gelatin, or acacia; or lubricating agents such as magnesium stearate, stearic acid, or talc.

Additional pharmaceutical compositions will be evident to those skilled in the art, including formulations involving an amphiphilic conjugate in sustained- or controlled-delivery formulations. In some embodiments, techniques for formulating a variety of other sustained- or controlled-delivery means, such as liposome carriers, bio-erodible microparticles or porous beads and depot injections, are also known to those skilled in the art. See for example, PCT Application No. PCT/US93/00829 which describes the controlled release of porous polymeric microparticles for the delivery of pharmaceutical compositions. In some embodiments, sustained-release preparations can include semipermeable polymer matrices in the form of shaped articles, e.g., films, or microcapsules. Sustained release matrices can include polyesters, hydrogels, polylactides (U.S. Pat. No. 3,773,919 and EP 058,481), copolymers of L-glutamic acid and gamma ethyl-L-glutamate (Sidman et al., Biopolymers, 22:547-556 (1983)), poly (2-hydroxyethyl-methacrylate) (Langer et al., J. Biomed. Mater. Res., 15: 167-277 (1981) and Langer, Chem. Tech., 12:98-105 (1982)), ethylene vinyl acetate (Langer et al., supra) or poly-D(−)-3-hydroxybutyric acid (EP 133,988). In some embodiments, sustained release compositions can also include liposomes, which can be prepared by any of several methods known in the art. See, e.g., Eppstein et al, Proc. Natl. Acad. Sci. USA, 82:3688-3692 (1985); EP 036,676; EP 088,046 and EP 143,949.

The pharmaceutical composition to be used for in vivo administration typically is sterile. In some embodiments, this can be accomplished by filtration through sterile filtration membranes. In certain embodiments, where the composition is lyophilized, sterilization using this method can be conducted either prior to or following lyophilization and reconstitution. In some embodiments, the composition for parenteral administration can be stored in lyophilized form or in a solution. In some embodiments, parenteral compositions generally are placed into a container having a sterile access port, for example, an intravenous solution bag or vial having a stopper pierceable by a hypodermic injection needle.

In some embodiments, once the pharmaceutical composition has been formulated, it can be stored in sterile vials as a solution, suspension, gel, emulsion, solid, or as a dehydrated or lyophilized powder. In some embodiments, such formulations can be stored either in a ready-to-use form or in a form (e.g., lyophilized) that is reconstituted prior to administration.

In some embodiments, kits are provided for producing a single-dose administration unit. In some embodiments, the kit can contain both a first container having a dried protein and a second container having an aqueous formulation. In some embodiments, kits containing single and multi-chambered pre-filled syringes (e.g., liquid syringes and lyosyringes) are included.

In some embodiments, the effective amount of a pharmaceutical composition including an amphiphilic conjugate to be employed therapeutically will depend, for example, upon the therapeutic context and objectives. One skilled in the art will appreciate that the appropriate dosage levels for treatment, according to certain embodiments, will thus vary depending, in part, upon the molecule delivered, the indication for which an amphiphilic conjugate is being used, the route of administration, and the size (body weight, body surface or organ size) and/or condition (the age and general health) of the patient. In some embodiments, the clinician can titer the dosage and modify the route of administration to obtain the optimal therapeutic effect.

In some embodiments, the frequency of dosing will take into account the pharmacokinetic parameters of the amphiphilic conjugate, in the formulation used. In some embodiments, a clinician will administer the composition until a dosage is reached that achieves the desired effect. In some embodiments, the composition can therefore be administered as a single dose, or as two or more doses (which may or may not contain the same amount of the desired molecule) over time, or as a continuous infusion via an implantation device or catheter. Further refinement of the appropriate dosage is routinely made by those of ordinary skill in the art and is within the ambit of tasks routinely performed by them. In some embodiments, appropriate dosages can be ascertained through use of appropriate dose-response data.

In some embodiments, the route of administration of the pharmaceutical composition is in accord with known methods, e.g., orally, through injection by intravenous, intraperitoneal, intracerebral (intra-parenchymal), intracerebroventricular, intramuscular, subcutaneously, intra-ocular, intraarterial, intraportal, or intralesional routes; by sustained release systems or by implantation devices. In certain embodiments, the compositions can be administered by bolus injection or continuously by infusion, or by implantation device. In certain embodiments, individual elements of the combination therapy may be administered by different routes.

In some embodiments, the composition can be administered locally via implantation of a membrane, sponge or another appropriate material onto which the desired molecule has been absorbed or encapsulated. In some embodiments, where an implantation device is used, the device can be implanted into any suitable tissue or organ, and delivery of the desired molecule can be via diffusion, timed-release bolus, or continuous administration. In some embodiments, it can be desirable to use a pharmaceutical composition including an amphiphilic conjugate in an ex vivo manner. In such instances, cells, tissues and/or organs that have been removed from the patient are exposed to a pharmaceutical composition including an amphiphilic conjugate, after which the cells, tissues and/or organs are subsequently implanted back into the patient.

In some embodiments, an amphiphilic conjugate can be delivered by implanting certain cells that have been genetically engineered, using methods such as those described herein, to express and secrete the polypeptides. In some embodiments, such cells can be animal or human cells, and can be autologous, heterologous, or xenogeneic. In some embodiments, the cells can be immortalized. In some embodiments, in order to decrease the chance of an immunological response, the cells can be encapsulated to avoid infiltration of surrounding tissues. In some embodiments, the encapsulation materials are typically biocompatible, semi-permeable polymeric enclosures or membranes that allow the release of the protein product(s) but prevent the destruction of the cells by the patients immune system or by other detrimental factors from the surrounding tissues.

Methods

In some

In some embodiments, the disclosure provides methods of expanding an immune cell expressing an engineered receptor (e.g., a CAR, a chimeric cytokine receptor, a chimeric co-stimulation receptor, or a synNotch receptor) in vivo in a subject, including administering a composition including an amphiphilic lipid conjugate described herein.

In some embodiments, the disclosure provides methods of stimulating proliferation of an immune cell expressing an engineered receptor (e.g., a CAR, a chimeric cytokine receptor, a chimeric co-stimulation receptor, or a synNotch receptor) in vivo in a subject, including administering a composition having an amphiphilic lipid conjugate described herein.

In some embodiments, the disclosure provides methods for treating a subject having a disease, disorder or condition associated with expression or elevated expression of an antigen, including administering to the subject an immune cell expressing an engineered receptor (e.g., a CAR, a chimeric cytokine receptor, a chimeric co-stimulation receptor, or a synNotch receptor) targeted to the antigen, and an amphiphilic lipid conjugate.

In some embodiments, the subject is administered the immune cell expressing an engineered receptor (e.g., a CAR, a chimeric cytokine receptor, a chimeric co-stimulation receptor, or a synNotch receptor) prior to receiving the amphiphilic lipid conjugate. In some embodiments, the subject is administered the immune cell expressing an engineered receptor (e.g., a CAR, a chimeric cytokine receptor, a chimeric co-stimulation receptor, or a synNotch receptor) after receiving the amphiphilic lipid conjugate. In some embodiments, the subject is administered the immune cell expressing an engineered receptor (e.g., a CAR, a chimeric cytokine receptor, a chimeric co-stimulation receptor, or a synNotch receptor) and the amphiphilic lipid conjugate sequentially or simultaneously.

In some embodiments, wherein the CAR, the chimeric cytokine receptor, the chimeric co-stimulation receptor, or the synNotch receptor includes a tag binding domain, the methods disclosed herein further include administering a formulation of tagged proteins, wherein the tag binding domain binds the tagged proteins. In some embodiments, the protein of the tagged protein is an antibody or an antigen-binding fragment. In some embodiments, the tag binding domain is an antibody or antigen-binding fragment thereof. In some embodiments, the formulation of tagged proteins is administered to the subject prior to administration of the CAR, the chimeric cytokine receptor, the chimeric co-stimulation receptor, or the synNotch receptor effector cell and amphiphilic ligand conjugate. In some embodiments, the formulation of tagged proteins is administered to the subject concurrently (simultaneously or sequentially) with the CAR, the chimeric cytokine receptor, the chimeric co-stimulation receptor, or the synNotch receptor effector cells and amphiphilic ligand conjugate. In some embodiments, the formulation of tagged proteins is administered to the subject after administration of the CAR, the chimeric cytokine receptor, the chimeric co-stimulation receptor, or the synNotch receptor effector cells and amphiphilic ligand conjugate.

Methods for measuring expansion or proliferation of cells are known in the art. For example, the number of cells can be measured by introducing a dye (e.g., crystal violet) into cells, and measuring the dilution of the dye over time. Dilution indicates cell proliferation.

Cancer and Cancer Immunotherapy

In some embodiments, the amphiphilic ligand conjugate described herein, is useful for treating a disorder associated with abnormal apoptosis or a differentiative process (e.g., cellular proliferative disorders (e.g., hyperproliferaetive disorders) or cellular differentiative disorders, such as cancer). Non-limiting examples of cancers that are amenable to treatment with the methods of the present invention are described below.

Examples of cellular proliferative and/or differentiative disorders include cancer (e.g., carcinoma, sarcoma, metastatic disorders or hematopoietic neoplastic disorders, e.g., leukemias). A metastatic tumor can arise from a multitude of primary tumor types, including but not limited to those of prostate, colon, lung, breast and liver. Accordingly, the compositions used herein including an amphiphilic ligand conjugate can be administered to a patient who has cancer.

As used herein, we may use the terms "cancer" (or "cancerous"), "hyperproliferative," and "neoplastic" to refer to cells having the capacity for autonomous growth (i.e., an abnormal state or condition characterized by rapidly proliferating cell growth). Hyperproliferative and neoplastic disease states may be categorized as pathologic (i.e., characterizing or constituting a disease state), or they may be categorized as non-pathologic (i.e., as a deviation from normal but not associated with a disease state). The terms are meant to include all types of cancerous growths or oncogenic processes, metastatic tissues or malignantly transformed cells, tissues, or organs, irrespective of histopathologic type or stage of invasiveness. "Pathologic hyperproliferative" cells occur in disease states characterized by malignant tumor growth. Examples of non-pathologic hyperproliferative cells include proliferation of cells associated with wound repair.

The terms "cancer" or "neoplasm" are used to refer to malignancies of the various organ systems, including those affecting the lung, breast, thyroid, lymph glands and lymphoid tissue, gastrointestinal organs, and the genitourinary tract, as well as to adenocarcinomas which are generally considered to include malignancies such as most colon cancers, renal-cell carcinoma, prostate cancer and/or testicular tumors, non-small cell carcinoma of the lung, cancer of the small intestine and cancer of the esophagus.

The term "carcinoma" is art recognized and refers to malignancies of epithelial or endocrine tissues including respiratory system carcinomas, gastrointestinal system carcinomas, genitourinary system carcinomas, testicular carcinomas, breast carcinomas, prostatic carcinomas, endocrine system carcinomas, and melanomas. The amphiphilic ligand conjugate can be used to treat patients who have, who are suspected of having, or who may be at high risk for developing any type of cancer, including renal carcinoma or melanoma, or any viral disease. Exemplary carcinomas include those forming from tissue of the cervix, lung, prostate, breast, head and neck, colon and ovary. The term also includes carcinosarcomas, which include malignant tumors composed of carcinomatous and sarcomatous tissues. An "adenocarcinoma" refers to a carcinoma derived from glandular tissue or in which the tumor cells form recognizable glandular structures.

Additional examples of proliferative disorders include hematopoietic neoplastic disorders. As used herein, the term "hematopoietic neoplastic disorders" includes diseases involving hyperplastic/neoplastic cells of hematopoietic origin, e.g., arising from myeloid, lymphoid or erythroid lineages, or precursor cells thereof. Preferably, the diseases arise from poorly differentiated acute leukemias (e.g., erythroblastic leukemia and acute megakaryoblastic leukemia). Additional exemplary myeloid disorders include, but are not limited to, acute promyeloid leukemia (APML), acute myelogenous leukemia (AML) and chronic myelogenous leukemia (CML) (reviewed in Vaickus, L. (1991) Crit. Rev. in Oncol./Hemotol. 11:267-97); lymphoid malignancies include, but are not limited to acute lymphoblastic leukemia (ALL) which includes B-lineage ALL and T-lineage ALL, chronic lymphocytic leukemia (CLL), prolymphocytic leukemia (PLL), hairy cell leukemia (HLL) and Waldenstrom's macro globulinemia (WM). Additional forms of malignant lymphomas include, but are not limited to non-Hodgkin lymphoma and variants thereof, peripheral T cell lymphomas, adult T cell leukemia/lymphoma (ATL), cutaneous T cell lymphoma (CTCL), large granular lymphocytic leukemia (LGF), Hodgkin's disease and Reed-Sternberg disease.

It will be appreciated by those skilled in the art that amounts for an amphiphilic conjugate that is sufficient to reduce tumor growth and size, or a therapeutically effective amount, will vary not only on the particular compound or composition selected, but also with the route of administration, the nature of the condition being treated, and the age and condition of the patient, and will ultimately be at the discretion of the patient's physician or pharmacist. The length of time during which the compound used in the instant method will be given varies on an individual basis.

In some embodiments, the disclosure provides methods of reducing or decreasing the size of a tumor, or inhibiting a tumor growth in a need thereof, including administering to the subject an amphiphilic lipid conjugate described herein, wherein the subject is receiving or has received therapy with an immune cell expressing an engineered receptor (e.g., a CAR, a chimeric cytokine receptor, a chimeric co-stimulation receptor, or a synNotch receptor). In some embodiments, the disclosure provides methods for inducing an anti-tumor response in a subject with cancer, including administering to the subject an amphiphilic lipid conjugate described herein, wherein the subject is receiving or has received therapy with an immune cell expressing an engineered receptor (e.g., a CAR, a chimeric cytokine receptor, a chimeric co-stimulation receptor, or a synNotch receptor).

In some embodiments, the disclosure provides methods for stimulating an immune response to a target cell population or target tissue expressing an antigen in a subject, including administering an immune cell expressing an engineered receptor (e.g., a CAR, a chimeric cytokine receptor, a chimeric co-stimulation receptor, or a synNotch receptor) targeted to the antigen, and an amphiphilic lipid conjugate. In some embodiments, the immune response is a T-cell, a TIL (e.g., T cell, B cell, or an NK cell), an NK cell, an NKT cell, a gdT cell, a macrophage, a neutrophil, a dendritic cell, a mast cell, an eosinophil, or a basophil mediated immune response. In some embodiments, the immune response is an anti-tumor immune response. In some embodiments, the target cell population or target tissue is tumor cells or tumor tissue.

It will be appreciated by those skilled in the art that reference herein to treatment extends to prophylaxis as well as the treatment of the noted cancers and symptoms.

Infectious Diseases

In some embodiments, an amphiphilic lipid conjugate disclosed herein is useful for treating acute or chronic infectious diseases. Because viral infections are cleared primarily by T cells, an increase in T cell activity is therapeutically useful in situations where more rapid or thorough clearance of an infective viral agent would be beneficial to an animal or human subject.

Recently, CAR T cell therapy has been investigated for its usefulness in treating viral infections, such as human immunodeficiency virus (HIV), as described in PCT Publication No. WO 2015/077789; Hale et al., (2017) Engineering HIV-Resistant, Anti-HIV Chimeric Antigen Receptor T Cells. Molecular Therapy, Vol. 25(3): 570-579; Liu et al., (2016). ABSTRACT. Journal of Virology, 90(21), 9712-9724; Liu et al., (2015). ABSTRACT. Journal of Virology, 89(13), 6685-6694; Sahu et al., (2013). Virology, 446(1-2), 268-275.

Thus, in some embodiments the amphiphilic ligand conjugates are administered for the treatment of local or systemic viral infections, including, but not limited to, immunodeficiency (e.g., HIV), papilloma (e.g., HPV), herpes (e.g., HSV), encephalitis, influenza (e.g., human influenza vims A), and common cold (e.g., human rhinovirus) viral infections. In some embodiments, pharmaceutical formulations including the amphiphilic ligand conjugates are administered topically to treat viral skin diseases such as herpes lesions or shingles, or genital warts. In some embodiments, the amphiphilic ligand conjugates are administered to treat systemic viral diseases, including, but not limited to, AIDS, influenza, the common cold, or encephalitis.

In some embodiments, the disclosure provides methods for increasing proliferation of CAR effector cells (e.g., CAR T cells) in vivo, in a subject with a viral infection, including administering a composition including an amphiphilic ligand conjugate, wherein the CAR includes a viral peptide binding domain (e.g., a HIV Env binding domain), and wherein the amphiphilic ligand conjugate includes the viral peptide (e.g., HIV Env).

In some embodiments, the disclosure provides methods for expanding an immune cell expressing an engineered receptor (e.g., a CAR, a chimeric cytokine receptor, a chimeric co-stimulation receptor, or a synNotch receptor) in vivo, in a subject with a viral infection, including administering a composition including an amphiphilic ligand conjugate, wherein the engineered receptor includes a viral peptide binding domain (e.g., an HIV Env binding domain), and wherein the amphiphilic ligand conjugate includes the viral peptide (e.g., HIV Env).

In some embodiments, the disclosure provides methods of reducing a viral infection in a subject in need thereof, including administering to the subject an amphiphilic lipid conjugate described herein, wherein the subject is receiving or has received therapy with an immune cell expressing an engineered receptor (e.g., a CAR, a chimeric cytokine receptor, a chimeric co-stimulation receptor, or a synNotch receptor). In some embodiments, the disclosure provides methods for inducing an anti-viral response in a subject with cancer, including administering to the subject an amphiphilic lipid conjugate described herein, wherein the subject is receiving or has received therapy with an immune cell expressing an engineered receptor (e.g., a CAR, a chimeric cytokine receptor, a chimeric co-stimulation receptor, or a synNotch receptor).

It will be appreciated by those skilled in the art that reference herein to treatment extends to prophylaxis as well as the treatment of the noted infections and symptoms.

Kits

A kit can include an amphiphilic ligand conjugate, as disclosed herein, and instructions for use. The kits may include, in a suitable container, an amphiphilic ligand conjugate, one or more controls, and various buffers, reagents, enzymes and other standard ingredients well known in the art. In some embodiments, the kits further include an adjuvant. Accordingly, in some embodiments, the amphiphilic ligand conjugate and adjuvant are in the same vial. In some embodiments, the amphiphilic ligand conjugate and adjuvant are in separate vials.

The container can include at least one vial, well, test tube, flask, bottle, syringe, or other container means, into which an amphiphilic ligand conjugate may be placed, and in some instances, suitably aliquoted. When an additional component is provided, the kit can contain additional containers into which this compound may be placed. The kits can also include a means for containing an amphiphilic ligand conjugate, and any other reagent containers in close confinement for commercial sale. Such containers may include injection or blow-molded plastic containers into which the desired vials are retained.

Containers and/or kits can include labeling with instructions for use and/or warnings.

In some embodiments, the disclosure provides a kit including a container including a composition including an amphiphilic ligand conjugate, an optional pharmaceutically acceptable carrier, and a package insert including instructions for administration of the composition for treating or delaying progression of cancer in an individual receiving therapy with an immune cell expressing an engineered receptor (e.g., a CAR, a chimeric cytokine receptor, a chimeric co-stimulation receptor, or a synNotch receptor), wherein the amphiphilic ligand conjugate includes a lipid, a CAR ligand, a chimeric cytokine receptor target, a chimeric co-stimulation receptor target, or a synNotch receptor target, and optionally a linker. The amphiphilic ligand conjugate can optionally include two or more CAR ligands, chimeric cytokine receptor targets, chimeric co-stimulation receptor targets, or synNotch receptor targets. The amphiphilic ligand conjugate can also optionally include two or more of any combination of CAR ligands, chimeric cytokine receptor targets, chimeric co-stimulation receptor targets, or synNotch receptor targets. In some embodiments, the kit further includes an adjuvant and instructions for administration of the adjuvant for treating or delaying progression of cancer in an individual receiving therapy with an immune cell expressing an engineered receptor (e.g., a CAR, a chimeric cytokine receptor, a chimeric co-stimulation receptor, or a synNotch receptor). In some embodiments, the adjuvant is an amphiphilic oligonucleotide conjugate including an immunostimulatory oligonucleotide conjugated to a lipid with or without a linker, and optionally a polar compound.

In some embodiments, the disclosure provides a kit including a medicament including a composition including an amphiphilic ligand conjugate, an optional pharmaceutically acceptable carrier, and a package insert including instructions for administration of the medicament alone or in combination with a composition including an adjuvant and an optional pharmaceutically acceptable carrier, for treating or delaying progression of cancer in an individual receiving therapy with an immune cell expressing an engineered receptor (e.g., a CAR, a chimeric cytokine receptor, a chimeric co-stimulation receptor, or a synNotch receptor), wherein the amphiphilic ligand conjugate includes a lipid, a CAR ligand, a chimeric cytokine receptor target, a chimeric co-stimulation receptor target, or a synNotch receptor target, and optionally a linker. The amphiphilic ligand conjugate can optionally include two or more CAR ligands, chimeric cytokine receptor targets, chimeric co-stimulation receptor targets, or synNotch receptor targets. The amphiphilic ligand conjugate can also optionally include two or more of any combination of CAR ligands, chimeric cytokine receptor targets, chimeric co-stimulation receptor targets, or synNotch receptor targets.

In some embodiments, the disclosure provides a kit including a container including a composition including an amphiphilic ligand conjugate, an optional pharmaceutically acceptable carrier, and a package insert including instructions for administration of composition vaccine for expanding an immune cell expressing an engineered receptor (e.g., a CAR, a chimeric cytokine receptor, a chimeric co-stimulation receptor, or a synNotch receptor) in an individual receiving therapy with the immune cell expressing an engineered receptor, wherein the amphiphilic ligand conjugate includes a lipid, a CAR ligand, a chimeric cytokine receptor target, a chimeric co-stimulation receptor target, or a synNotch receptor target, and optionally a linker. The amphiphilic ligand conjugate can optionally include two or more CAR ligands, chimeric cytokine receptor targets, chimeric co-stimulation receptor targets, or synNotch receptor targets. The amphiphilic ligand conjugate can also optionally include two or more of any combination of CAR ligands, chimeric cytokine receptor targets, chimeric co-stimulation receptor targets, or synNotch receptor targets. In some embodiments, the kit further includes an adjuvant and instructions for administration of the adjuvant for expanding an immune cell expressing an engineered receptor (e.g., a CAR, a chimeric cytokine receptor, a chimeric co-stimulation receptor, or a synNotch receptor) in an individual receiving therapy with the immune cell expressing the engineered receptor. In some embodiments, the adjuvant is an amphiphilic oligonucleotide conjugate including an immunostimulatory oligonucleotide conjugated to a lipid with or without a linker, and optionally a polar compound.

In some embodiments, the disclosure provides a kit including a medicament including a composition including an amphiphilic ligand conjugate, an optional pharmaceutically acceptable carrier, and a package insert including instructions for administration of the medicament alone or in combination with a composition including an adjuvant and an optional pharmaceutically acceptable carrier, for expanding an immune cell expressing an engineered receptor (e.g., a CAR, a chimeric cytokine receptor, a chimeric co-stimulation receptor, or a synNotch receptor) in an individual receiving therapy with the immune cell expressing the engineered receptor, wherein the amphiphilic ligand conjugate includes a lipid, a CAR ligand, a chimeric cytokine receptor target, a chimeric co-stimulation receptor target, or a synNotch receptor target, and optionally a linker. The amphiphilic ligand conjugate can optionally include two or more CAR ligands, chimeric cytokine receptor targets, chimeric co-stimulation receptor targets, or the synNotch receptor targets. The amphiphilic ligand conjugate can also optionally include two or more of any combination of CAR ligands, chimeric cytokine receptor targets, chimeric co-stimulation receptor targets, or synNotch receptor targets.

In some embodiments, the disclosure provides a kit including a container including a composition including an amphiphilic ligand conjugate, an optional pharmaceutically acceptable carrier, and a package insert including instructions for administration of the composition for increasing proliferation of an immune cell expressing an engineered receptor (e.g., a CAR, a chimeric cytokine receptor, a chimeric co-stimulation receptor, or a synNotch receptor) in an individual receiving therapy with the immune cell expressing the engineered receptor, wherein the amphiphilic ligand conjugate includes a lipid, a CAR ligand, a chimeric cytokine receptor target, a chimeric co-stimulation receptor target, or a synNotch receptor target, and optionally a linker. The amphiphilic ligand conjugate can optionally include two or more CAR ligands, chimeric cytokine receptor targets, chimeric co-stimulation receptor targets, or synNotch receptor targets. The amphiphilic ligand conjugate can also optionally include two or more of any combination of CAR ligands, chimeric cytokine receptor targets, chimeric co-stimulation receptor targets, or synNotch receptor targets. In some aspects, the kit further includes an adjuvant and instructions for administration of the adjuvant for increasing proliferation of an immune cell expressing an engineered receptor (e.g., a CAR, a chimeric cytokine receptor, a chimeric co-stimulation receptor, or a synNotch receptor) in an individual receiving therapy with the immune cell expressing the engineered receptor. In some embodiments, the adjuvant is an amphiphilic oligonucleotide conjugate including an immunostimulatory oligonucleotide conjugated to a lipid with or without a linker, and optionally a polar compound.

In some embodiments, the disclosure provides a kit including a medicament including a composition including an amphiphilic ligand conjugate, an optional pharmaceutically acceptable carrier, and a package insert including instructions for administration of the medicament alone or in combination with a composition including an adjuvant and an optional pharmaceutically acceptable carrier, for increasing proliferation of an immune cell expressing an engineered receptor (e.g., a CAR, a chimeric cytokine receptor, a chimeric co-stimulation receptor, or a synNotch receptor) in an individual receiving therapy with the immune cell expressing the engineered receptor, wherein the amphiphilic ligand conjugate includes a lipid, a CAR ligand, a chimeric cytokine receptor target, a chimeric co-stimulation receptor target, or a synNotch receptor target, and optionally a linker. The amphiphilic ligand conjugate can optionally include two CAR ligands, chimeric cytokine receptor targets, chimeric co-stimulation receptor targets, or synNotch receptor targets.

EXAMPLES

Below are examples of specific embodiments for making the constructs and carrying out the methods described herein. These examples are provided for illustrative purposes only, and are not intended to limit the scope of the present invention in any way.

Example 1: Generation of DSPE-PEG-FITC and DSPE-PEG-Peptide/Protein Ligand

To generate the DSPE-PEG-FITC vaccine, PE(phosphoethanolamine) lipid (e.g., DSPE) is dissolved in 500 µL $CHCl_3$ and 500 µL DMF, 3 equivalents of triethylamine and 1.2 equivalents of fluorescein-$PEG_{2000}$-NHS (Creative PEG Works Inc.) are added and the reaction mixture is agitated overnight. The amphiphilic fluorescein PEG amphiphiles are purified by reverse phase HPLC using a C4 column (BioBasic-4, 200 mm×4.6 mm, Thermo Scientific), 100 mM triethylamineacetic acid buffer (TEAA, pH 7.5)-methanol (0-30 min, 10-100%) is used as an eluent. The final products is dissolved in $H_2O$ and quantified by UV-Vis spectroscopy (fluorescein, extinction-1-1 coefficient 70,000 $M^{-1}$ $cm^{-1}$ at 490 nm, pH 9) and characterized by MALDI-TOF mass spectrometry.

To generate the DSPE-PEG-peptide/protein ligand, N-terminal cysteine-modified peptides or protein ligand are dissolved in DMF and mixed with 2 equivalents maleimide-PEG2000-DSPE (Laysan Bio, Inc.), and the mixture is agitated at 25° C. for 24 hours. Bioconjugation is judged to be essentially complete by HPLC analysis. Peptide amphiphiles are characterized by MALDI-TOF mass spectrometry. The peptide conjugates are then diluted in 10×dd$H_2O$, lyophilized into powder, redissolved in $H_2O$, and stored at −80° C.

Example 2: In Vitro Activation of Anti-FITC Immune Cells by DSPE-PEG-FITC Coated Cells To determine the effect of an amphiphilic ligand conjugate on a chimeric antigen receptor (CAR) expressing immune cell (e.g., a B cell, natural killer (NK) cell, macrophage, neutrophil, dendritic cell, mast cell, eosinophil, basophil, or TIL), in vitro stimulation of CAR-immune cells is assessed after co-culture with antigen presenting cells (APCs) providing the amphiphilic ligand conjugate. Specifically, model CAR-immune cells expressing anti-FITC CARs are generated by retroviral transduction of a DNA vector including an anti-FITC (fluorescein) scFV (4m5.3) coding region fused in-frame to a Myc epitope tag coding region and to a CAR coding region including a CD8 transmembrane domain, a CD28 signaling domain, and a CD3z signaling domain into an immune cell. Surface expression of the Myc-tagged anti-FITC CAR in the immune cell is quantified by incubating the transduced cells with a fluorescently-labeled anti-Myc antibody and quantifying the fluorescent cells by flow cytometry.

Example 3: Amphiphiles for Chimeric Antigen Receptors (CARs)

Immune cells (e.g., B cells, natural killer (NK) cells, macrophages, neutrophils, dendritic cells, mast cells, eosinophils, basophils, or TILs) are obtained from a patient having a tumor or a cancer. An anti-FITC CAR, which includes an anti-FITC scFv as the target-binding domain, is transduced into the immune cell. The immune cell is administered to the patient. An amphiphile including FITC (Amph-FITC) is administered to the patient prior to, after, or concurrently with administration of the CAR-expressing immune cell to the patient. Tumor size is monitored in the patient and tumor size is reduced over time following administration of the CAR-expressing immune cell and the amphiphile.

Example 4: Amphiphiles for Chimeric Cytokine Receptors

Immune cells (e.g., T cells, TILs, NK cells, natural killer T (NKT) cells, gamma delta T (gdT) cells, macrophages, neutrophils, dendritic cells, mast cells, eosinophils, or basophils) are obtained from a patient having a tumor or a cancer.

In one example, a pair of chimeric cytokine receptors is designed: one including a target-binding domain including FKBP, or a portion thereof, and an IL-2Rβ intracellular cytokine receptor domain, the second including a target-binding domain including FRB, or a portion thereof, and a common γ chain intracellular cytokine receptor domain. In a second example, a different pair of chimeric cytokine receptors are designed: one including a target-binding domain including an anti-FITC scFv and an IL-2Rβ intracellular cytokine receptor domain, the second including a target-binding domain including avidin, or a portion thereof, and a common γ chain intracellular cytokine receptor domain.

The pair of chimeric cytokine receptors, or one of the chimeric cytokine receptors described above, is transduced into the immune cell, which is then administered to the patient. The immune cell into which the chimeric cytokine receptors are transduced may optionally include a CAR as described herein, a T cell receptor (TCR), or a transgenic TCR (tgTCR). An amphiphile including AP21967 (Amph-AP21967) is administered to the patient prior to, after, or concurrently with administration of the chimeric cytokine receptor-expressing immune cell to the patient. Tumor size is monitored in the patient and tumor size is reduced over time following administration of the chimeric cytokine receptor-expressing immune cell and the amphiphile.

Example 5: Amphiphiles for Chimeric Co-Stimulation Receptors

In one example, immune cells (e.g., T cells, TILs, NK cells, NKT cells, gdT cells, macrophages, neutrophils, dendritic cells, mast cells, eosinophils, or basophils) are obtained from a patient having a tumor or a cancer. A chimeric co-stimulation receptor is designed where the extracellular domain includes a target-binding domain including two FKBP proteins, or portions thereof, and a co-stimulatory domain including the inducible MyD88/CD40 co-stimulatory domain. The chimeric co-stimulation receptor is transduced into the immune cell and administered to the patient. The immune cell optionally includes a CAR, a TCR, or a tgTCR. An amphiphilic ligand conjugate including AP20187 (Amph-AP20187) is administered to the patient prior to, after, or concurrently with administration of the chimeric co-stimulation receptor-expressing immune cell to the patient. Tumor size is monitored in the patient and tumor size decreases over time following administration of the chimeric co-stimulation receptor-expressing immune cell and the amphiphile.

In a second example, a chimeric co-stimulation receptor is designed where the extracellular domain include a target-binding domain including an anti-FITC scFv. The chimeric co-stimulation receptor includes one of a CD28, an OX40, an ICOS, a GITR, a CD40, or a CD27 co-stimulatory domain. The chimeric co-stimulation receptor further includes a CD3ζ intracellular signaling domain. Immune cells (e.g., T cells, TILs, NK cells, NKT cells, gdT cells, macrophages, neutrophils, dendritic cells, mast cells, eosinophils, or basophils) are obtained from a patient having a tumor or a cancer, into which the chimeric co-stimulation receptor is transduced. The immune cells are then administered to the patient. Optionally, the immune cell includes a CAR, a TCR, or a tgTCR. Amph-FITC is administered to the patient prior to, after, or concurrently with administration of the chimeric co-stimulation receptor-expressing immune cell to the patient. Tumor size is monitored in the patient and tumor size decreases over time following administration of the chimeric co-stimulation receptor-expressing immune cell and the amphiphile.

Example 6: Amphiphiles for Synthetic Notch (SynNotch) Receptors

Immune cells (e.g., T cells, TILs, NK cells, NKT cells, gdT cells, macrophages, neutrophils, dendritic cells, mast cells, eosinophils, or basophils) are obtained from a patient having a tumor or a cancer. A synNotch receptor is designed including an extracellular domain including a target-binding domain having an anti-FITC scFv. The synNotch receptor induces secretion of a cytokine, e.g., IL-2, IL-15, IL-7, IL-21, IL-12, IFN-α, or IFN-β, upon binding of the target-binding domain with FITC. The synNotch receptor is transduced into the immune cells, which are then administered to the patient. Optionally, the immune cell includes a CAR, a TCR, or a tgTCR. Amph-FITC is administered to the patient prior to, after, or concurrently with administration of the synNotch receptor-expressing immune cells to the patient. Tumor size is monitored in the patient and tumor size decreases over time following administration of the syn-Notch receptor-expressing immune cell and the amphiphile.

OTHER EMBODIMENTS

Although the foregoing invention has been described in some detail by way of illustration and example for purposes of clarity of understanding, the descriptions and examples should not be construed as limiting the scope of the invention. The disclosures of all patent and scientific literature cited herein are expressly incorporated in their entirety by reference.

What is claimed is:

1. A method of stimulating an immune response to a target cell population or a target tissue in a subject, the method comprising administering a composition to the subject, wherein the composition comprises an amphiphilic ligand conjugate comprising a lipid, a chimeric antigen receptor (CAR) ligand, and a polar block linker that couples the lipid to the CAR ligand,
    wherein the lipid is 1,2-distearoyl-sn-glycero-3-phosphoethanolamine (DSPE), the linker is a polyethylene glycol (PEG) linker, the CAR ligand is fluorescein isothiocyanate (FITC), wherein the subject comprises an immune cell comprising a CAR,
wherein the CAR comprises an extracellular domain comprising a target-binding domain that binds to FITC,
wherein the immune cell is a B cell, a natural killer (NK) cell, a macrophage, a neutrophil, a dendritic cell, a mast cell, an eosinophil, a basophil, or a tumor infiltrating lymphocyte (TIL), and
wherein the immune cell is not a T cell.

2. The method of claim 1, wherein the CAR further comprises a transmembrane domain and an intracellular signaling domain.

3. The method of claim 2, wherein the CAR further comprises one or more co-stimulatory domains.

4. The method of claim 1, wherein the composition further comprises an adjuvant, wherein the adjuvant is an amphiphilic oligonucleotide conjugate comprising an immunostimulatory oligonucleotide conjugated to a lipid, with or without a linker, and optionally a polar compound.

5. The method of claim 1, wherein the amphiphilic ligand conjugate binds albumin under physiological conditions.

* * * * *

SEQUENCE LISTING

```
<160> NUMBER OF SEQ ID NOS: 1

<210> SEQ ID NO 1
<211> LENGTH: 25
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<223> OTHER INFORMATION: lipophilic compound on 5' end
<220> FEATURE:
<221> NAME/KEY: misc_feature
<222> LOCATION: (2)..(5)
<223> OTHER INFORMATION: g may or may not be present

<400> SEQUENCE: 1
gggggtccat gacgttcctg acgtt                                          25
```